United States Patent
Sato

(10) Patent No.: US 8,861,848 B2
(45) Date of Patent: Oct. 14, 2014

(54) IMAGE PROCESSOR AND IMAGE PROCESSING METHOD

(71) Applicant: Sony Corporation, Tokyo (JP)

(72) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 13/711,901

(22) Filed: Dec. 12, 2012

(65) Prior Publication Data

US 2013/0188867 A1      Jul. 25, 2013

(30) Foreign Application Priority Data

Jan. 19, 2012   (JP) ................................. 2012-009327

(51) Int. Cl.
   *G06K 9/36*   (2006.01)
   *G06T 9/00*   (2006.01)

(52) U.S. Cl.
   CPC ...................................... *G06T 9/004* (2013.01)
   USPC .......................................... 382/166; 382/233

(58) Field of Classification Search
   USPC .......................... 382/166, 233, 236, 238, 248; 375/240.13, 240.24, 240.25
   See application file for complete search history.

(56) References Cited

U.S. PATENT DOCUMENTS

| 6,134,373 | A  | * | 10/2000 | Strolle et al. .................. 386/304 |
| 6,696,993 | B2 | * | 2/2004 | Karczewicz .................... 341/67 |
| 8,102,921 | B2 | * | 1/2012 | Suh et al. ................. 375/240.27 |
| 2007/0025441 | A1 | * | 2/2007 | Ugur et al. ............... 375/240.03 |
| 2010/0284459 | A1 | * | 11/2010 | Jeong et al. .............. 375/240.12 |

OTHER PUBLICATIONS

Chen et al., "CE6.A.4: Chroma intra prediction by reconstructed luma samples," Joint Collaborative Team on Video Coding, 5th Meeting, Geneva, Switzerland, Mar. 2011.

Bross et al., "WD4: Working Draft 4 of High-Efficiency Video Coding," Joint Collaborative Team on Video Coding, 6th Meeting, Torino, Italy, Jul. 2011.

* cited by examiner

*Primary Examiner* — Phuoc Tran
(74) *Attorney, Agent, or Firm* — Sherr & Jiang, PLLC

(57) ABSTRACT

An image processor includes a phase shift section to shift, upon field encoding an image in an interlaced format having different vertical resolutions in a luminance signal and a color difference signal, a phase of the luminance signal in accordance with a type of current field, which is subjected to process, and a vertical resolution ratio of the luminance signal to the color difference signal; a prediction image generation section to generate an intra prediction image of the color difference signal using the luminance signal having the phase shifted by the phase shift section; and an encoding section to encode, using the intra prediction image generated by the prediction image generation section, the image.

20 Claims, 20 Drawing Sheets

⊘ LUMINANCE SIGNAL
○ COLOR DIFFERENCE SIGNAL

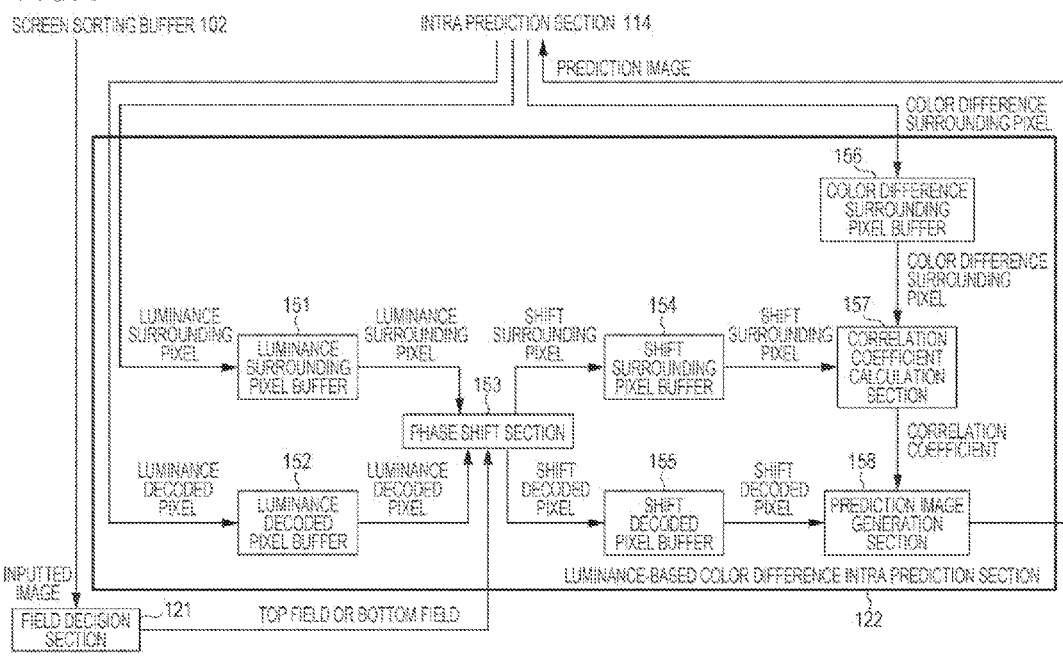

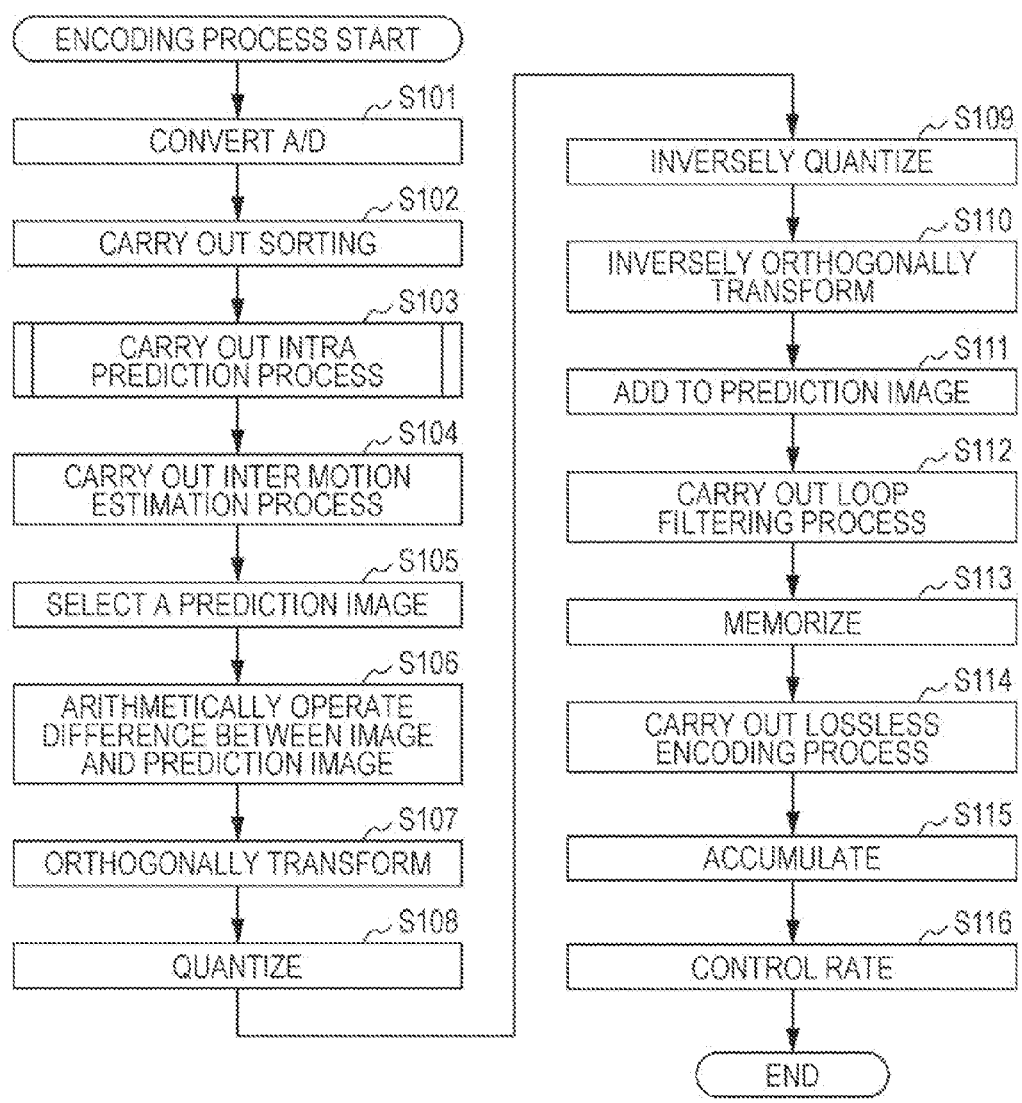

IMAGE PROCESSOR AND IMAGE PROCESSING METHOD

BACKGROUND

The present disclosure relates to an image processor and an image processing method, and more particularly to an image processor and an image processing method that inhibit production of a phase shift in a color difference signal in intra prediction.

In recent years, apparatuses in conformity with a scheme, such as MPEG (moving picture experts group), that handles image information digitally, and at that occasion, compresses by orthogonal transformation, such as discrete cosine transform, and motion compensation for highly efficient transmission and accumulation of information utilizing the redundancy typical of the image information have been widespread in both information distribution of a broadcasting station and the like and information reception in households.

In particular, MPEG2 (ISO (International Organization for Standardization)/IEC (International Electrotechnical Commission) 13818-2) is defined as general purpose image encoding, is a standard that covers both interlaced scanning images and progressive scanning images and also standard resolution images and high resolution images, and is currently widely used for a wide range of applications for professional use and consumer use. By using MPEG2 compression, for example, an amount of coding (bit rate) of from 4 to 8 Mbps is allocated to an interlaced scanning image of standard resolution having 720×480 pixels and an amount of coding (bit rate) of from 18 to 22 Mbps is allocated so an interlaced scanning image of high resolution having 1920×1088 pixels, thereby enabling a high compression rate and good image quality.

MPEG2 is mainly directed to high image quality encoding adapted to broadcasting, while it toes not correspond to encoding of an amount of coding (bit rate) lower than MPEG1, that is, of a higher compression rate. For the widespread mobile phone terminals, above-mentioned encoding may be increased in the future, and corresponding to this, MPEG4 encoding may be standardized. Regarding image encoding, the specification of ISO/TEC 14496-2 is approved as an international standard in December 1998.

Further, in recent years, initially for the purpose of image encoding for video conference, a standard of H.26L (ITU-T (International Telecommunication Union Telecommunication Standardization Sector) Q6/16 VCEG (Video Coding Expert Group)) is advancing in normalization. It is understood that H.26L enables higher encoding efficiency while requesting a more amount of arithmetic operations for encoding and decoding thereof compared with encoding in the past, such as MPEG2 and MPEG4. In addition, currently, as part of the MPEG4 activity, standardization is carried out as Joint Model of Enhanced-Compression Video Coding that enables higher encoding efficiency by incorporating functions not supported by H.26L as well on the basis of the H.26L.

As a schedule for standardization, the H.26L standard became an international standard in the name of H.264 and MPEG-4 Part10 (advanced video coding, hereinafter referred to as AVC) in March 2003.

In AVC, a hierarchical structure with macroblocks and submacroblocks as processing units for encoding (encoding units) is defined. However, it is not optimal to have the macroblock size of 16 pixels×16 pixels for a large image frame, such as a UHD (ultra high definition; 4000 pixels×2000 pixels), as subjected to next generation encoding.

With that, in HEVC (high efficiency video coding) to be post AVC encoding, a coding unit (CU) is defined as an encoding unit instead of the macroblock (for example, refer to Benjamin Bross, Woo-Jin Han, Jens-Rainer Ohm, Gary J. Sullivan, Thomas Wiegand, "Working Draft 4 of High-Efficiency Video Coding", JCTVC-F803_d2, Joint Collaborative Team on Video Coding (JCT-VC) of ITU-T SG16 WP3 and ISO/IEC JTC1/SC29/WG11 6th Meeting: Torino, IT, 14-22 Jul., 2011).

In such AVC and HEVC, many modes are prepared for intra prediction. As one of them, for example, there is proposed intra prediction of a color difference signal (LM (linear model) mode) utilizing correlationship between a luminance signal and a color difference signal (for example, refer to Jianle Chen, Vadim Seregin, Woo-Jin Han, Jungsun Kim, Eyeongmoon Jean, "CE6.a.4: Chroma intra prediction by reconstructed luma samples", JCTVC-E266, Joint Collaborative Team on Video Coding (JCT-VC) of ITU-T SG16 WP3 and ISO/IEC JTC1/SC29/WG11 5th Meeting: Geneva, 16-23 Mar., 2011).

SUMMARY

However, in a case that an input is in a format of a luminance signal and a color difference signal having different vertical resolutions from each other and also is an interlaced signal, the phase of the luminance signal and the phase of the color difference signal shift in a manner different from a case of a format of the luminance signal and the color difference signal having a vertical resolution identical to each other.

Accordingly, there has been a risk of producing phase shift in a color difference signal when carrying out intra prediction process in an GM mode (may be referred to as luminance-based color difference intra prediction process) similar to the case of a format of a luminance signal and a color difference signal having a vertical resolution identical to each other without considering the phase relationship.

It is desirable to inhibit, production of phase shift in a color difference signal in intra prediction.

An image processor according to an embodiment of the present disclosure includes: a phase shift section to shift, upon field encoding an image in an interlaced format having different vertical resolutions in a luminance signal and a color difference signal, a phase of the luminance signal in accordance with a type of current field, which is subjected to process, and a vertical resolution ratio of the luminance signal to the color difference signal; a prediction image generation section to generate an intra prediction image of the color difference signal using the luminance signal having the phase shifted by the phase shift section; and an encoding section to encode, using the intra prediction image generated by the prediction image generation section, the Image.

It is possible than the phase shift section shifts a phase of a luminance decoded pixel, which is the luminance signal of a pixel in a current region subjected to process, and a phase of a luminance surrounding pixel, which is the luminance signal of a surrounding pixel located around the current region, respectively.

It is possible that the image processor further includes a correlation coefficient generation section to generate a correlation coefficient using a color difference surrounding pixel, which is the color difference signal of the surrounding pixel, and a shift surrounding pixel, which is the luminance surrounding pixel having the phase shifted by the phase shift section. The prediction image generation section generates the intra prediction image of the color difference signal from a shift decoded pixel, which is the luminance decoded pixel having the phase shifted by the phase shift section, using the correlation coefficient generated by the correlation coefficient generation section.

It is possible that the phase shift section determines a shift amount and a direction of the phase of the luminance signal in accordance with the type of current field and the vertical resolution ratio of the luminance signal to the color difference signal and shifts the phase of the luminance signal to shift amount and the direction thus determined.

It is possible than the phase shift section shifts, in a case that a vertical resolution ratio of the luminance signal to the color difference signal is 2:1 and also the current field is a top field, the phase of the luminance signal to a ¼ phase, and shifts, in a case that the vertical resolution ratio of the luminance signal to the color difference signal is 2:1 and also the current field is a bottom field, the phase of the luminance signal to a ¾ phase.

It is possible that the phase shift section enables phase shift of the luminance signal by linear interpolation.

It is possible that the phase shift section enables phase shift of the luminance signal by an FIR filter.

It is possible that the phase shift section uses a filter of a ¼ pixel accuracy for motion compensation as the FIR filter.

It is possible that the image processor further includes a field decision section to make a decision on the type of current field. The phase shift section shifts the phase of the luminance signal based on a result of decision by the field decision section.

An image processing method according to another embodiment of the present disclosure of an image processor includes: shifting, upon field encoding an image in an interlaced format having different vertical resolutions in a luminance signal and a color difference signal, a phase of the luminance signal in accordance with a type of current field, which is subjected to process, and a vertical resolution ratio of the luminance signal to the color difference signal in a phase shift section; generating an intra prediction image of the color difference signal using the luminance signal having the shifted phase in a prediction image generation section; and encoding, using the intra prediction image thus generated, the image in an encoding section.

An image processor according to still another embodiment of the present disclosure includes: a decoding section to decode encoded data in which an image in an interlaced format having different vertical resolutions in a luminance signal and a color difference signal is field encoded; a phase shift section to shift a phase of the luminance signal in accordance with a type of current field, which is subjected to process, and a vertical resolution ratio of the luminance signal to the color difference signal of a difference image between the image and a prediction image of the image obtained by decoding the encoded data by the decoding section; a prediction image generation section to generate an intra prediction image of the color difference signal using the luminance, signal having the phase shifted by the phase shift section; and an arithmetic section to add the intra prediction image generated by the prediction image generation section to the difference image and to generate the image.

It is possible that the phase shift section shifts a phase of a luminance decoded pixel, which is the luminance signal of a pixel in a current region subjected to process, and a phase of a luminance surrounding pixel, which is the luminance signal of a surrounding pixel located around the current region, respectively.

It is possible that the image processor further includes: a correlation coefficient generation section to generate a correlation coefficient using a color difference surrounding pixel, which is the color difference signal of the surrounding pixel, and a shift surrounding pixel, which is the luminance surrounding pixel having the phase shifted by the phase shift section. The prediction image generation section generates the intra prediction image of the color difference signal from a shift decoded pixel, which is the luminance decoded pixel having the phase shifted by the phase shift section, using the correlation coefficient generated by the correlation coefficient generation section.

It is possible that the phase shift section determines a shift amount and a direction of the phase of the luminance signal in accordance with the type of current field and the vertical resolution ratio of the luminance signal to the color difference signal and shifts the phase of the luminance signal to shift amount and the direction thus determined.

It is possible that the phase shift section shifts, in a case that a vertical resolution ratio of the luminance signal to the color difference signal is 2:1 and also the current field is a top field, the phase of the luminance signal to a ¼ phase, and shifts, in a case that the vertical resolution ratio of the luminance signal to the color difference signal is 2:1 and also the current field is a bottom field, the phase of the luminance signal to a ¾ phase.

It is possible than the phase shift section enables phase shift of the luminance signal by linear interpolation.

It is possible that the phase shift section enables phase shift of the luminance signal by an FIR filter.

It is possible that the phase shift section uses a filter of a ¼ pixel accuracy for motion compensation as the FIR filter.

It is possible that the image processor further includes: a field decision section to make a decision on the type of current field. The phase shift section shifts the phase of the luminance signal based on a result of decision by the field decision section.

An image processing method according to yet another embodiment of the present disclosure of an image processor includes: decoding encoded data in which an image in an interlaced format having different vertical resolutions in a luminance signal and a color difference signal is field encoded in a decoding section; shifting a phase of the luminance signal in accordance with a type of current field, which is subjected to process, and a vertical resolution ratio of the luminance signal to the color difference signal of a difference image between the image and a prediction image of the image obtained by decoding the encoded data in a phase shift section; generating an intra prediction image of the color difference signal using the luminance signal having the shifted phase in a prediction image generation section; and adding the intra prediction image thus generated to the difference image and generating the image in an arithmetic section.

According to yet another embodiment of the present disclosure, upon field encoding an image in an interlaced format having different vertical resolutions in a luminance signal and a color difference signal, a phase of the luminance signal is shifted in accordance with a type of current field, which is subjected to process, and a vertical resolution ratio of the luminance signal to the color difference signal, an intra prediction image of the color difference signal is generated using the luminance signal having the phase shifted, and the image is encoded using the intra prediction image generated.

According to yet another embodiment of the present disclosure, encoded data in which an image in an interlaced format having different vertical, resolutions in a luminance signal and a color difference signal is field encoded is decoded, a phase of the luminance signal is shifted in accordance with a type of current field, which is subjected to process, and a vertical resolution ratio of the luminance signal to the color difference signal of a difference image between the image and a prediction image of the image obtained by decoding the encoded data, an intra prediction image of the color difference signal is generated using the luminance signal having the phase shifted, and the image is generated by adding the intra prediction image generated to the difference image.

According to the embodiments of the present disclosure, an image can be processed. In particular, it is possible to inhibit production of phase shift of a color difference component in intra prediction.

BRIEF DESCRIPTION OF THE DRAWINGS

FIG. 7 is a block diagram illustrating a main configuration example of a luminance-based color difference intra prediction section;

FIG. 8 is a flowchart explaining an example of a flow of encoding process;

DETAILED DESCRIPTION OF EMBODIMENTS

Embodiments of the present disclosure (hereinafter, referred to as embodiments) are described below.

Descriptions are given in the following order.
1. First Embodiment (Image Encoder)
2. Second Embodiment (Image Decoder)
3. Third Embodiment (Computer)
4. Fourth Embodiment (Television Apparatus)
5. Fifth Embodiment (Mobile Phone)
6. Sixth Embodiment (Recorder/Reproducer)
7. Seventh Embodiment (Imager)

1. First Embodiment

Image Encoder

Figure 1:
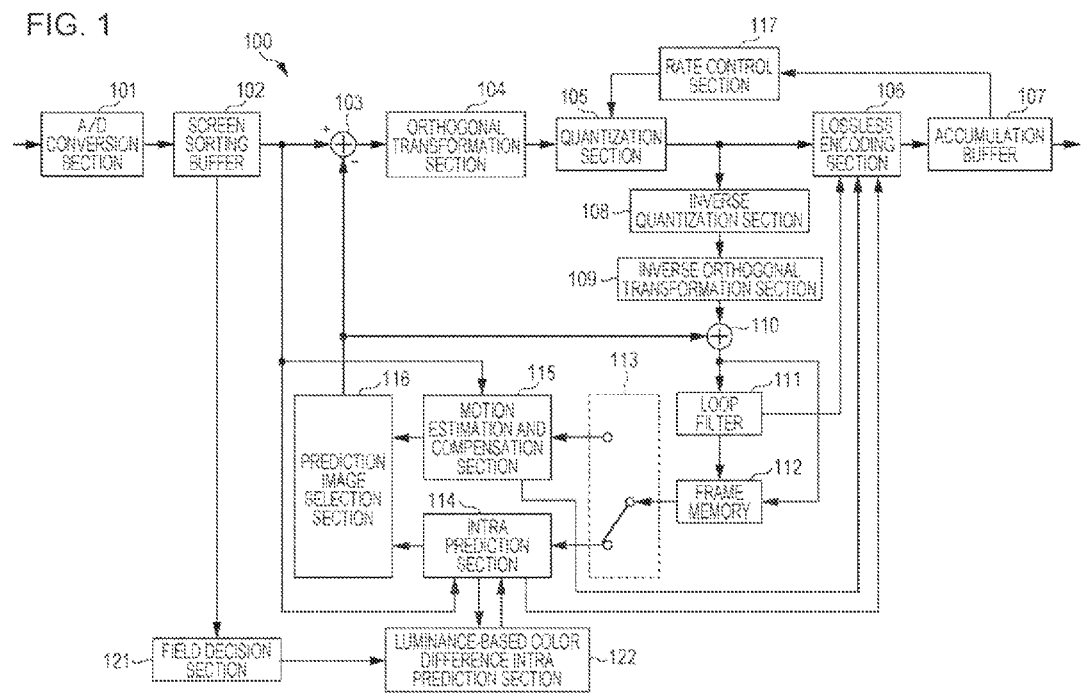
FIG. 1 is a block diagram illustrating a main configuration example of an image encoder.

FIG. 1 is a block diagram illustrating a main configuration example of an image encoder as an image processor to which an embodiment of the present technique is applied.

An image encoder 100 illustrated in FIG. 1 encodes image data of a dynamic picture image as, for example, HEVC (high efficiency video coding) encoding and H.264 and MPEG (moving picture experts group) 4 Part 10 (AVG (advanced video coding)) encoding.

As illustrated in FIG. 1, the image encoder 100 has an A/D conversion section 101, a screen sorting buffer 102, an arithmetic section 103, an orthogonal transformation section 104, a quantization section 105, a lossless encoding section 106, and an accumulation buffer 107. The image encoder 100 also has an inverse quantization section 108, an inverse orthogonal transformation section 109, an arithmetic section 110, a loop filter 111, a frame memory 112, a selection section 113, an intra prediction section 114, a motion estimation and compensation section 115, a prediction image selection section 116, and a rate control section 117.

The A/D conversion section 101 converts A/D of inputted image data to supply the image data after conversion (digital data) to the screen sorting buffer 102 for memorization. The screen sorting buffer 102 sorts the memorized images of frames in a display order into a frame order for encoding in accordance with the GOP (group of picture) to supply the images in the sorted frame order to the arithmetic section 103. The screen sorting buffer 102 supplies each frame image to the arithmetic section 103 for each predetermined subregion to be a processing unit of encoding process (encoding unit).

The screen sorting buffer 102 also supplies the images in the sorted frame order to the intra prediction section 114 and the motion estimation and compensation section 115 similarly for each subregion.

The arithmetic section 103 subtracts the prediction image supplied from the intra prediction section 114 or the motion estimation and compensation section 115 is the prediction image selection section 116 from the images read out of the screen sorting buffer 102 to output the difference information to the orthogonal transformation section 104. For example, in a case of an image subjected to intra encoding, the arithmetic section 103 subtracts the prediction image supplied from the intra prediction section 114 from the images read out of the screen sorting buffer 102. In addition, in a case of an image subjected to inter encoding, for example, the arithmetic section 103 subtracts the prediction image supplied from the motion estimation and compensation section 115 from the images read out of the screen sorting buffer 102.

The orthogonal transformation section 104 applies orthogonal transformation, such as discrete cosine transform and Karhunen Loéve transform, to the difference information supplied from the arithmetic section 103. The method of orthogonal transformation is optional. The orthogonal transformation section 104 supplies a transformation coefficient obtained by the orthogonal transformation to the quantization section 105.

The quantization section 105 quantizes the transformation coefficient supplied from the orthogonal transformation section 104. The quantization section 105 supplies the quantized transformation coefficient to the loss less encoding section 106.

The lossless encoding section 106 encodes the transformation coefficient quantized in the quantization section 105 in an optional scheme of encoding to generate encoded data (bit stream). Since the coefficient data is quantized under the control of the rate control section 117, an amount of coding in the encoded data becomes a target value set by the rate control section 117 (or approximates the target value).

The lossless encoding section 106 also obtains intra prediction information including information showing a mode for intra prediction and the like from the intra prediction section 114 and obtains inter prediction information including information showing a mode for inter prediction, motion vector information, and the like from the motion estimation and compensation section 115. Further, the lossless encoding section 106 obtains a filter coefficient used in the loop filter 111 and the like.

The lossless encoding section 106 encodes these various types of information in an optional scheme of encoding to include (multiplex) in encoded data (bit stream). The lossless encoding section 106 supplies the encoded data thus generated to the accumulation buffer 107 for accumulation.

The encoding in the lossless encoding section 106 may include, for example, variable length coding and arithmetic coding. The variable length coding may include, for example, CAVLC (context-adaptive variable length coding) defined in H.264/AVC scheme. The arithmetic coding may include, for example, CABAC (context-adaptive binary arithmetic coding).

The accumulation buffer 107 temporarily holds the encoded data supplied from the lossless encoding section 106. The accumulation buffer 107 outputs the encoded data held therein as a bit stream to, for example, a recording apparatus (recording medium), a transmission line, or the like, not shown, in a later stage at a predetermined timing. That is, various types of encoded information are supplied to an apparatus to decode the encoded data obtained by encoding the image data by the image encoder 100 (hereinafter, may be referred to as a decoding side apparatus) (for example, an image decoder 200 in FIG. 11 described later).

The transformation coefficient quantized in the quantization section 105 is also supplied to the inverse quantization section 108. The inverse quantization section 108 inversely quantizes the quantized transformation coefficient in a method corresponding to the quantization by the quantization section 105. The inverse quantization section 108 supplies the transformation coefficient thus obtained to the inverse orthogonal transformation section 109.

The inverse orthogonal transformation section 109 inversely orthogonally transforms the transformation coefficient supplied from the inverse quantization section 108 in a method corresponding to the orthogonal transformation by the orthogonal transformation section 104. The inversely orthogonally transformed output (locally decoded difference information) is supplied to the arithmetic section 110.

The arithmetic section 110 adds a prediction image supplied via the prediction image selection section 116 from the intra prediction section 114 or the motion estimation and compensation section 115 to the inverse orthogonal transformation result supplied from the inverse orthogonal transformation section 109, in other words, the locally decoded difference information to obtain a locally reconfigured image (hereinafter, referred to as a reconfigured image). The reconfigured image is supplied to the loop filter 111 or the frame memory 112.

The loop filter 111 includes a deblocking filter, an adaptive loop filter, and the like, and appropriately applies filtering process to the reconfigured image supplied from the arithmetic section 110. For example, the loop filter 111 applies deblocking filtering process so the reconfigured image, thereby eliminating block distortion in the reconfigured image. In addition, for example, the loop filter 111 also applies loop filtering process to the deblocking filtering process result (the reconfigured image subjected to the elimination of block distortion) using a wiener filter, thereby improving the image quality.

The loop filter 111 may also apply other optional filtering process further to the reconfigured image. The loop filter 111 can also supply information, such as the filter coefficient used for the filtering process, as desired to the lossless encoding section 106 for encoding.

The loop filter 111 supplies the filtering process result (hereinafter, referred to as a decoded image) to the frame memory 112.

The frame memory 112 memorizes the reconfigured image supplied from the arithmetic section 110 and the decoded image supplied from the loop filter 111, respectively. The frame memory 112 supplies the reconfigured image memorized therein via the selection section 113 to the intra prediction section 114 at a predetermined timing or based on a request from outside, such as the intra prediction section 114. The frame memory 112 also supplies the decoded image memorized therein via the selection section 113 to the motion estimation and compensation section 115 at a predetermined timing or based on a request from outside, such as the motion estimation and compensation section 115.

The selection section 113 shows a supply destination of the image outputted from the frame memory 112. For example, in a case of intra prediction, the selection section 113 reads an image not subjected to filtering process (reconfigured image) out of the frame memory 112 to supply it as a surrounding image to the intra prediction section 114.

In addition, for example, in a case of inter prediction, the selection section 113 reads an image subjected to the filtering process (decoded image) out of the frame memory 112 to supply it as a reference image to the motion estimation and compensation section 115.

As obtaining an image in a surrounding region (surrounding image) located around a process target region from the frame memory 112, the intra prediction section 114 carries out intra prediction (intra-frame prediction) to generate a prediction image using a pixel value of the surrounding image and basically taking a prediction unit (PU) as a processing unit. The intra prediction section 114 carries out the intra prediction in a plurality of modes (intra prediction modes) prepared in advance.

That is, the intra prediction section 114 generates a prediction image in all candidate intra prediction modes, evaluates a cost function value of each prediction image using inputted images supplied from the screen sorting buffer 102, and selects an optimal mode. As selecting the optimal intra prediction mode, the intra prediction section 114 supplies a prediction image generated in the optimal mode to the prediction image selection section 116.

The intra prediction section 114 also supplies the intra prediction information including information related to intra prediction, such as the optimal intra prediction mode, appropriately to the lossless encoding section 106 for encoding.

The motion estimation and compensation section 115 carries out motion estimation (inter prediction) using the inputted images supplied from the screen sorting buffer 102 and the reference image supplied from the frame memory 112 and basically taking a PU (inter PU) as a processing unit, and carries out motion compensation process in accordance with the motion vector thus detected to generate a prediction image (inter prediction image information). The motion estimation and compensation section 115 carries out such inter prediction in a plurality of modes (inter prediction modes) prepared in advance.

That is, the motion estimation and compensation section 115 generates a prediction image in all candidate inter prediction modes, evaluates a cost function value of each prediction image, and selects an optimal mode. As selecting the optimal inter prediction mode, the motion estimation and compensation section 115 supplies a prediction image generated in the optimal mode to the prediction image selection section 116.

The motion estimation and compensation section 115 also supplies the inter prediction information including information related to inter prediction, such as the optimal inter prediction mode, to the lossless encoding section 106 for encoding.

The prediction image selection section 116 selects a source of supply for a prediction image to be supplied to the arithmetic section 103 and the arithmetic section 110. For example, in a case of intra encoding, the prediction image selection section 116 selects the intra prediction section 114 as the source of supply for a prediction image and supplies the prediction image supplied from the intra prediction section 114 to the arithmetic section 103 and the arithmetic section 110. In addition, for example, in a case of inter encoding, the prediction image selection section 116 selects the motion estimation and compensation section 115 as the source of supply for a prediction image and supplies the prediction image supplied, from the motion estimation and compensation section 115 to the arithmetic section 103 and the arithmetic section 110.

The rate control section 117 controls a rate of quantization behavior of the quantization section 105 not to produce overflow or underflow based on the amount of coding in the encoded data accumulated in the accumulation buffer 107.

Further, the image encoder 100 has a field decision section 121 and a luminance-based color difference intra prediction section 122.

In a case that the format of the image data inputted to the image encoder 100 is an interlaced format having different vertical, resolutions in a luminance signal and a color difference signal, the field, decision section 121 obtains inputted images from the screen sorting buffer 102.

The field decision section 121 makes a decision on the type of current field, which is subjected to the process, of the inputted images thus obtained. The field decision section 121 supplies information showing a result of the decision to the luminance-based color difference intra prediction section 122.

The luminance-based color difference intra prediction section 122 carries out intra prediction of the color difference signal for a current region, which is subjected to the process of intra prediction carried out by the intra prediction section 114. At that occasion, the luminance-based color difference intra prediction section 122 carries out intra prediction in an LM mode (luminance-based color difference intra prediction), in which a prediction image of the color difference signal is generated using the luminance signal, utilizing correlation between the luminance signal and the color difference signal.

The luminance-based color difference intra prediction section 122 phase shifts the luminance signal in accordance with the result of the field decision supplied from the field decision section 121 and a vertical resolution ratio of the luminance signal to the color difference signal in the luminance-based, color difference intra prediction to generate a prediction image of the color difference signal.

The luminance-based color difference intra prediction section 122 returns the prediction image thus generated as a result of intra prediction to the intra prediction section 114. The intra prediction section 114 selects an optimal intra prediction mode including this mode.

[Coding Unit]

In AVC, a hierarchical structure with macroblocks and submacroblocks as processing units for encoding (encoding units) is defined. However, it is not optimal to have the macroblock size of 16 pixels×16 pixels for a large image frame, such as a UI-ID (ultra high definition; 4000 pixels×2000 pixels), as subjected to next generation encoding.

With that, in HEVC (high efficiency video coding) to be post AVC encoding, a coding unit (CU) is defined as an encoding unit instead of the macroblock.

The coding unit (CU) is also called as a coding tree block (CTB) and is a subregion in the multilayer structure of images per picture that plays a role similar to the macroblock in AVC. That is, a CU is a unit for encoding process (encoding unit). Whereas the size of macroblock is fixed to 16×16 pixels, the size of CU is not fixed and is specified in image compression information in a respective sequence.

In particular, a CU having a maximum size is called as a largest coding unit (LCU) and a CU having a minimum size is referred to as a smallest coding unit (SCU). In other words, an LCU is a largest encoding unit and an SCU is a smallest encoding unit. For example, the sizes of these regions are specified in a sequence parameter set contained in the image compression information, where they are limited to a square and the size expressed as a power of 2, respectively. That is, each region of a CU in a certain level of hierarchy (square) divided into four by 2×2 becomes CUs of one-level lower in the hierarchy (square).

Figure 2:
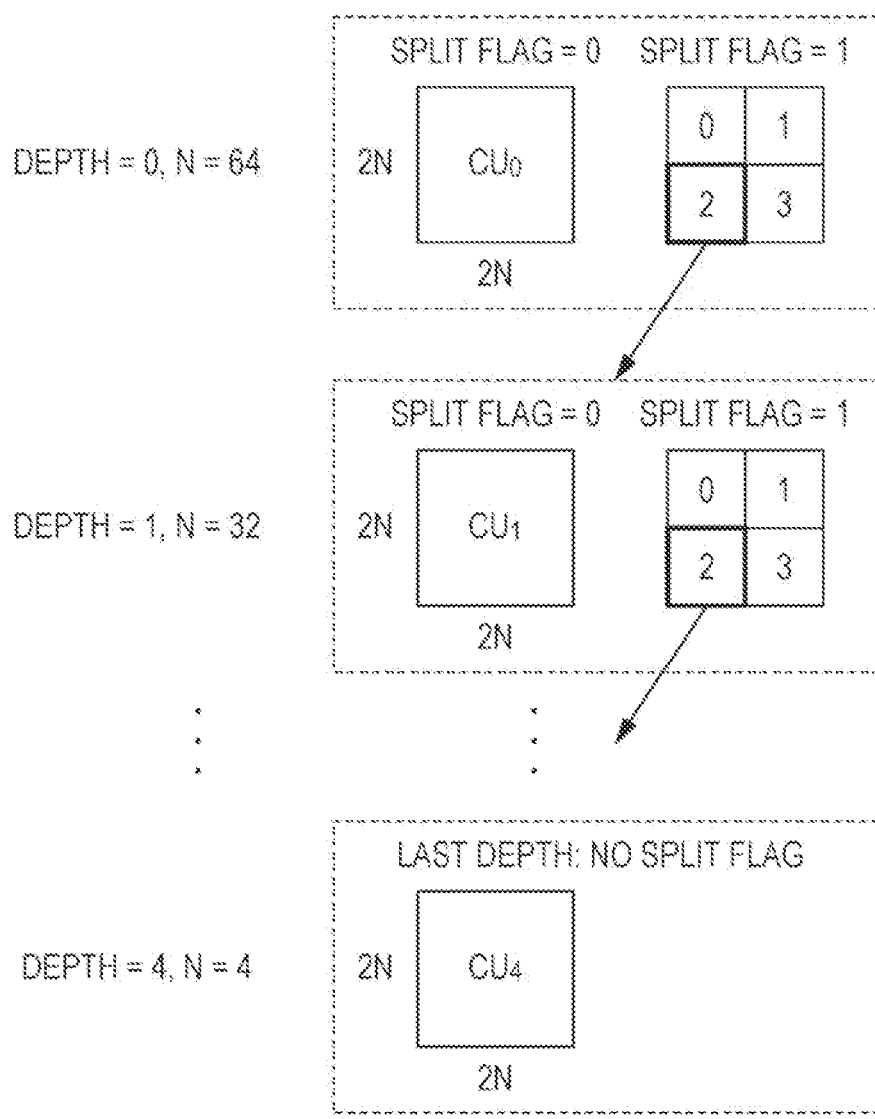
FIG. 2 illustrates a configuration example of a coding unit.

FIG. 2 illustrates an example of a coding unit defined in HEVC. In the example of FIG. 2, the size of LCU is 128 (2N (N=64)) and the maximum hierarchical depth becomes 5 (depth=4). In a case that a value of split flag is the CU having a size of 2N×2N is divided into CUs having a size of N×N, which are one-level lower in the hierarchy.

Further, a CU is divided into prediction units (PUs), which are regions to be processing units (subregions of images per picture) of intro or inter prediction, and is also divided into transform units (TUs), which are regions to be processing units (subregions of images per picture) of orthogonal transformation.

In a case of a PU of inter prediction (inter prediction unit), four types of size of 2N×2N, 2N×N, N×2N, and N×N can be set for a CU having a size of 2N×2N. That is, for one CU, it is possible to define one PU having a size same as the CU, two PUs obtained by dividing the CU into two longitudinally or transversely, or four PUs obtained by dividing into two, respectively, longitudinally and transversely.

The image encoder 100 carries out each process related to encoding taking such subregions of images per picture as processing units. A description is given below to a case that the image encoder 100 takes a CU defined in HEVC as an encoding unit. That is, an LCD becomes a largest encoding unit and an SCU becomes a smallest encoding unit. It should be noted that a processing unit of each process of encoding by the image encoder 100 is not limited to this and is optional. For example, macroblocks and submacroblocks defined in AVC may also be the processing units.

In the following description, a (sub) region includes (may also be any of them) all of the various types of region described above (for example, a macroblock, a submacroblock, an LCU, a CU, an SCU, a PU, a TU, and the like). Naturally, a unit other than above may also be included, and an unfit unit is appropriately eliminated in accordance with the context of the description.

[Luminance-Based Color Difference Intra Prediction]

A luminance signal and a color difference signal are correlated with each other, and utilizing the relationship, luminance-based color difference intra prediction that carries out intra prediction of a color difference signal using a luminance signal is proposed.

For example, an intra prediction image $Pred_C[x,y]$ of a color difference signal is calculated as an equation (1) below using $Rec_L'[x,y]$ obtained by ½ phase shifting a decoded image $Rec_L[x, y]$ of a luminance signal vertically as the example illustrated in FIG. 3.

$$Pred_C[x,y] = \alpha \cdot Rec_L'[x,y] + \beta \quad (1)$$

Here, calculation of $Rec_L'[x,y]$ from $Rec_L[x,y]$ is carried out by linear interpolation as an equation (2) below.

$$Rec_L'[x,y] = (Rec_L[2x,2y] + Rec_L[2x,2y+1]) >> 1 \quad (2)$$

The values of coefficients $\alpha$ and $\beta$ in the equation (1) are calculated as equations (3) and (4) below using values of an adjacent pixel in a luminance signal and a color difference signal for each block.

$$\alpha = \frac{I \cdot \sum_{i=0}^{I} Rec_C(i) \cdot Rec_L'(i) - \sum_{i=0}^{I} Rec_C(i) \cdot \sum_{i=0}^{I} Rec_L'(i)}{I \cdot \sum_{i=0}^{I} Rec_L'(i) \cdot Rec_L'(i) - \left(\sum_{i=0}^{I} Rec_L'(i)\right)^2} \quad (3)$$

$$\beta = \frac{\sum_{i=0}^{I} Rec_C(i) - \alpha \cdot \sum_{i=0}^{I} Rec_L'(i)}{I} \quad (4)$$

Since the process described above is carried out by referring to a lookup table, division is dispensable for an actual process.

Figure 4:
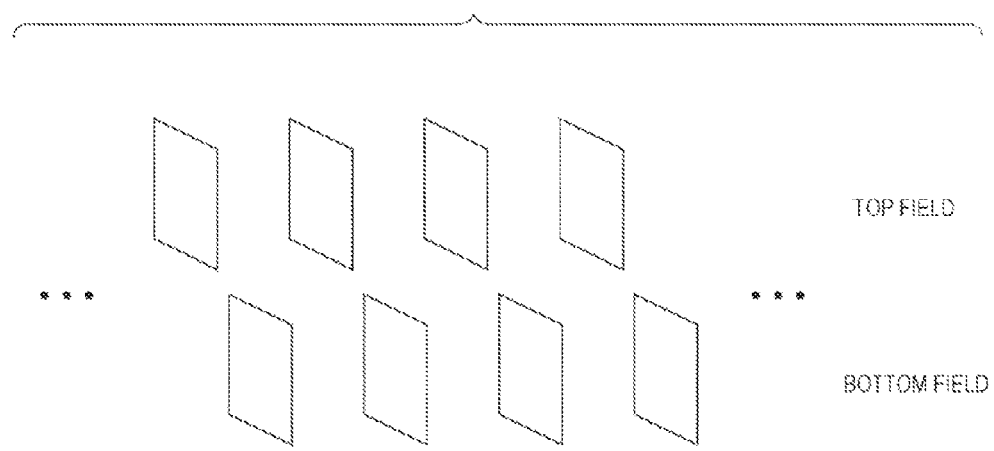
FIG. 4 illustrates field-based encoding process.

In AVC encoding and the like for example, in a case that an inputted image is an interlaced signal, it is possible to carry out field encoding, as illustrated in FIG. 4, that divides into a top field and a bottom field for encoding.

Figure 5:
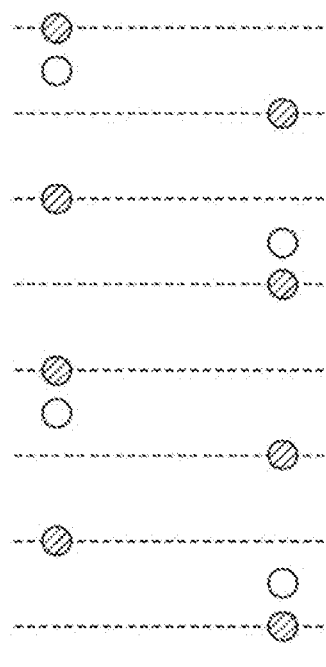
FIG. 5 illustrates an example of phase relationship between a luminance signal and a color difference signal.

For example, in a case that an inputted image is in an interlaced format of 4:2:0 to be field, encoded, the phase relationship between a luminance signal and a color difference signal is a relationship as the example illustrated in FIG. 5.

That is, in a case that an inputted image is an interlaced image subjected to such field encoding and also is an image in a format having different vertical resolutions in the luminance signal and the color difference signal, a width of the phase shift in the color difference signal relative to the luminance signal does not become a ½ phase as an a case that an inputted image is progressive.

Figure 3:
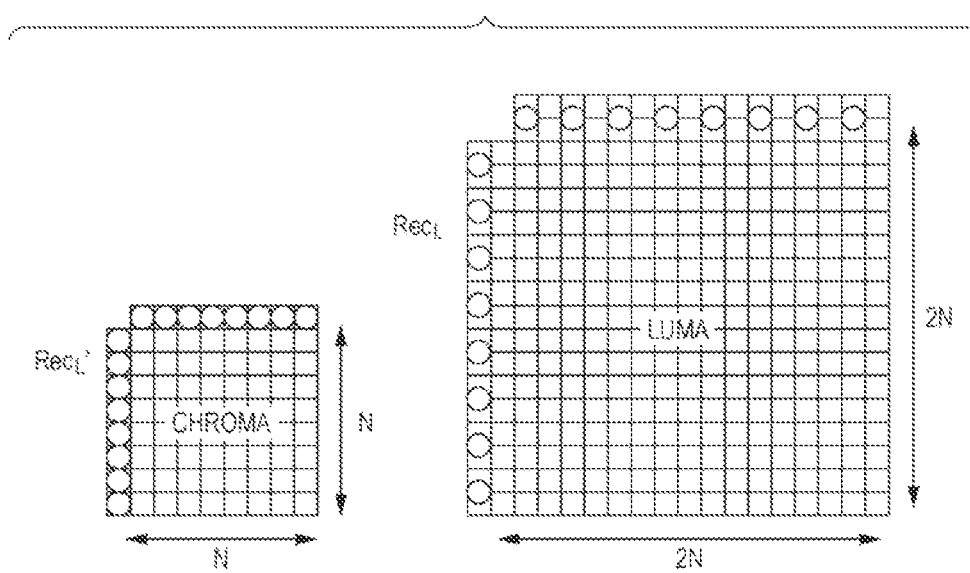
FIG. 3 illustrates an example of phase shift in an LM mode.

Accordingly, when carrying out intra prediction without taking such phase difference characteristics into account (for example, carrying out luminance-based color difference intra prediction in the past that carries out phase shift as in FIG. 3), there has been a risk of producing phase shift in the color difference signal and reducing encoding efficiency.

With that, the luminance-based color difference intra prediction section 122 determines a shift amount and a direction of a phase of the luminance signal upon generating a prediction image of the color difference signal in accordance with the type of current field, which is subjected to the process, and the vertical resolution ratio of the luminance signal to the color difference signal.

A more specific description is given. For example, an inputted image is assumed to be in an interlaced format of 4:2:0 to be field encoded. The field decision section 121 makes a decision on the type (whether it is the top field or bottom field) of current field, which is subjected to the process.

Figure 6A:
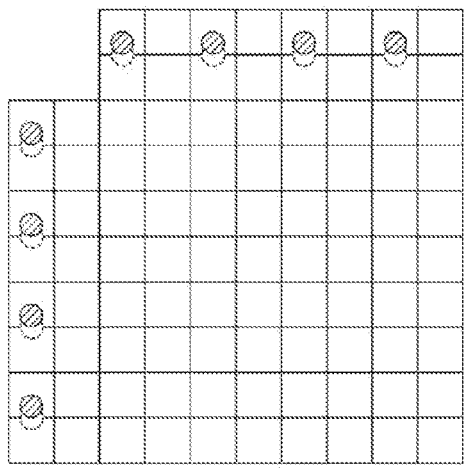
FIGS. 6A and 6B illustrate an example of phase shift of a color difference signal.

In a case that the current field, is the top field, the luminance-based color difference intra prediction section 122 shifts the phase of the luminance signal vertically to a ¼ higher phase (carries out ¼ phase shift) as illustrated in FIG. 6A in accordance with the result of the decision.

Figure 6B:
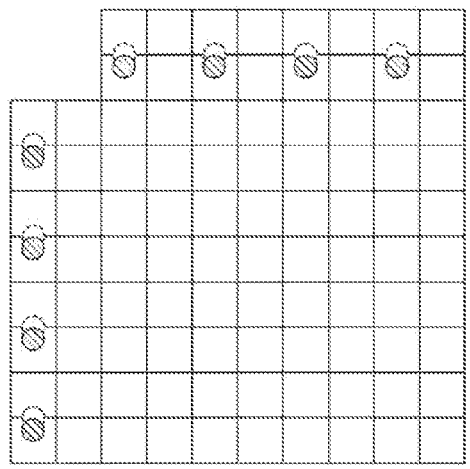

In a case that the current field is the bottom field, the luminance-based, color difference intra prediction section 122 shifts the phase of the luminance signal vertically to a ¼ lower phase (carries out ¾ phase shift) as illustrated in FIG. 6B.

The luminance-based color difference intra prediction section 122 generates a prediction image of the color difference signal using the luminance signal thus phase shifted.

This allows the luminance-based color difference intra prediction section 122 to enable phase shift in accordance with the type of current field in consideration of the phase relationship as illustrated in FIG. 5. Accordingly, the luminance-based color difference intra prediction section 122 can inhibit production of phase shift in a color difference signal in intra prediction even in a case that the inputted image is an image to be field encoded in an interlaced format having different vertical resolutions in the luminance signal and the color difference signal.

That is, the luminance-based color difference intra prediction section 122 can generate an intra prediction image of the color difference signal with high prediction accuracy. Accordingly, the image encoder 100 can improve the encoding efficiency and can also inhibit reduction of image quality of a decoded image caused by production of phase shift in the color difference signal in intra prediction.

While a case that an inputted, image is in an interlaced format of 4:2:0 is described in the above description, the vertical resolution ratio of the luminance signal to the color difference signal is optional.

[Luminance-Based Color Difference Intra Prediction Section]

FIG. 7 is a block diagram illustrating a main configuration example of the luminance-based color difference intra prediction section 122 in FIG. 1.

As illustrated in FIG. 7, the luminance-based color difference intra prediction section 122 has a luminance surrounding pixel buffer 151, a luminance decoded pixel buffer 152, a phase shift section 153, a shift surrounding pixel buffer 154, a shift decoded pixel buffer 155, a color difference surrounding pixel buffer 156, a correlation coefficient calculation section 157, and a prediction image generation section 158.

The luminance surrounding pixel buffer 151 obtains a luminance signal (luminance surrounding pixel) of a pixel located around a current region (surrounding pixel), which is subjected to the process, from the intra prediction section 114 for memorization. The luminance surrounding pixel buffer 151 supplies the luminance surrounding pixel memorized therein to the phase shift section 153 at a predetermined timing or in accordance with a request from outside, such as the phase shift section 153.

The term "surrounding" includes "adjacent" and "neighborhood". That is, a "surrounding pixel" also includes an "adjacent pixel" adjacent to the current region and a "neighborhood pixel" located in the neighborhood of the current region. This is same in the following description as well.

The luminance decoded pixel buffer 152 obtains a locally decoded luminance signal in a current region (luminance decoded pixel) from the intra prediction section 114 for memorization. The luminance decoded pixel buffer 152 supplies the luminance decoded pixel memorized therein to the phase shift section 153 at a predetermined timing or in accordance with a request from outside, such as the phase sorts section 153.

The phase shift section 153 obtains information showing the type of current field (whether it is the top field or bottom field) from the field decision section 121. The phase shift section 153 phase shifts the luminance surrounding pixel and the luminance decoded pixel thus supplied based on the information.

That is, the phase shift section 153 determines a shift amount and a direction of a phase of the luminance surrounding pixel and the luminance decoded pixel in accordance with the type of current field, which is subjected to the process, and the vertical resolution ratio of the luminance signal to the color difference signal.

Then, the phase shift section 153 shifts phases of the luminance surrounding pixel and the luminance decoded pixel in the shift amount and the direction thereof. The phase shift may also be enabled by linear interpolation as, for example, the equation (2) above. In addition, the phase shift may also be enabled using several taps of an FIR filter. For example, while a motion compensation interpolation filter of ¼ pixel accuracy is defined in HEVC, phase shift of a luminance surrounding pixel and a luminance decoded pixel may also be carried out using this Thus, the motion estimation and compensation section 115 and the phase shift section 153 share the filter, thereby enabling cost reduction.

The phase shift section 153 supplies a shift surrounding pixel, which is a phase shifted luminance surrounding pixel, to the shift surrounding pixel buffer 154 for memorization. In addition, the phase shift section 153 supplies a shift decoded pixel, which is a phase shifted luminance decoded pixel, to the shift decoded pixel buffer 155 for memorization.

The shift surrounding pixel buffer 154 memorizes the shift surrounding pixel supplied from the phase shift section 153. In addition, the shift surrounding pixel buffer 154 supplies the shift surrounding pixel memorized therein to the correlation coefficient calculation section 157 at a predetermined timing or in accordance with a request from outside, such as the correlation coefficient calculation section 157.

The shift decoded pixel buffer 155 memorizes the shift decoded pixel supplied from the phase shift section 153. In addition, the shift decoded pixel buffer 155 supplies the shift decoded pixel memorized therein to the prediction image generation section 158 at a predetermined timing or in accordance with a request from outside, such as the prediction image generation section 158.

The color difference surrounding pixel buffer 156 obtains a color difference signal of a surrounding pixel in the current region (color difference surrounding pixel) from the intra prediction section 114 for memorization. The color difference surrounding pixel buffer 156 supplies the color difference surrounding pixel, memorized therein to the correlation coefficient calculation section 157 at a predetermined timing or in accordance with a request from outside, such as the correlation coefficient calculation section 157.

The correlation coefficient calculation section 157 calculates a correlation coefficient used for generation of a prediction image (for example, $\alpha$ and $\beta$) using the shift surrounding pixel supplied from the shift surrounding pixel buffer 154 and the color difference surrounding pixel supplied from the color difference surrounding pixel buffer 156. The correlation coefficient $\alpha$ is calculated using, for example, the above equation (3). The correlation coefficient $\beta$ is calculated using, for example, the equation (4) above. The correlation coefficient calculation section 157 supplies the correlation coefficient thus calculated (for example, $\alpha$ and $\beta$) to the prediction image generation section 158.

The prediction image generation section 158 generates an intra prediction image of the color difference signal from the shift decoded pixel supplied from the shift decoded pixel buffer 155 using the correlation coefficient supplied from the correlation coefficient calculation section 157. The prediction image generation section 158 generates the prediction image using, for example, the equation (1) above. The prediction image generation section 158 supplies the intra prediction image of the color difference signal thus generated to the intra prediction section 114.

As described above, since the phase shift section 153 carries out phase shift in accordance with the format (the vertical resolution ratio of the luminance signal to the color difference signal) of the inputted image and the type of current field, the luminance-based color difference intra prediction section 122 can generate an intra prediction image of high prediction accuracy. Accordingly, the image encoder 100 can improve the encoding efficiency and can also inhibit reduction of image quality of a decoded image caused by production of phase shift in the color difference signal in intra prediction.

[Flow of Encoding Process]

Next, a flow of each process executed by the image encoder 100 as above is described. Firstly, with reference to the flowchart in FIG. 8, an example of a flow of encoding process is described.

In step S101, the A/D conversion section 101 converts A/D of the inputted image. In step S102, the screen sorting buffer 102 memorizes the A/D converted image and carries out sorting of each picture from a displaying order so an encoding order.

In step S103, the intra prediction section 114 carries out intra prediction process of an intra prediction mode. In step S104, the motion estimation and compensation section 115 carries out inter motion estimation process that carries out motion estimation and motion compensation in an inter prediction mode.

In step S105, the prediction image selection section 116 determines an optimal prediction mode based on each cost function value outputted from the intra prediction section 114 and the motion estimation and compensation section 115. That is, the prediction image selection section 116 selects any one of the prediction image generated by the intra prediction section 114 and the prediction image generated by the motion estimation and compensation section 115.

In step S106, the arithmetic section 103 arithmetically operates a difference between the images sorted by the process in to S102 and the prediction image selected, by the process in step S105. The difference data is reduced in the data volume compared with the original image data. Accordingly, compared with a case of directly encoding an image, it is possible to compress the data volume.

In step S107, the orthogonal transformation section 104 orthogonally transforms the difference information generated by the process in step S106. In step S108, the quantization section 105 quantizes an orthogonal transformation coefficient generated by the process in step S107.

The difference information quantized by the process in step S108 is locally decoded as follows. In other words, in step S109, the inverse quantization section 108 inversely quantizes the orthogonal transformation coefficient quantized in step S108 in a method corresponding to the quantization. In step S110, the inverse orthogonal transformation section 109 inversely orthogonally transforms the orthogonal transformation coefficient obtained by the process in step S109 in a method corresponding to the process in step S107.

In step S111, the arithmetic section 110 adds the prediction image to the locally decoded difference information to generate a locally decoded image (an image corresponding to the input to the arithmetic section 103). In step S112, the loop filter 111 filters the image generated by the process in step S111. This eliminates block distortion and the like.

In step S113, the frame memory 112 memorizes the image subjected to elimination of block distortion and the like by the process in step S112. To the frame memory 112, an image not subjected to filtering process by the loop filter 111 is also supplied from the arithmetic section 110 for memorization.

The images memorized in the frame memory 112 are utilized for the process in step S103 and the process in step S104.

In step S111, the lossless encoding section 106 encodes the transformation coefficient quantized by the process in step S108 to generate encoded data. In other words, a difference image (in a case of inter, a secondary difference image) is subjected to lossless encoding, such as variable length coding and arithmetic coding.

The lossless encoding section 106 encodes information related to the prediction mode for the prediction image selected by the process in step S105 and adds it to the encoded data obtained by encoding the difference image. For example, in a case of selecting an intra prediction mode, the lossless encoding section 106 encodes intra prediction mode information. In addition, for example, in a case of selecting an inter prediction mode, the lossless encoding section 106 encodes inter prediction mode information. These items of information are added (multiplexed) to the encoded data as, for example, header information or the like.

In step S115, the accumulation buffer 107 accumulates the encoded data generated by the process in step S114. The encoded data accumulated in the accumulation buffer 107 is appropriately read out and is transmitted to a decoding side apparatus via an optional transmission line (including not only a communication line but also a memory medium and the like).

In step S116, the rate control section 117 controls the rate of quantization behavior of the quantization section 105 not to produce overflow or underflow based on the compressed image accumulated in the accumulation buffer 107 by the process in step S115.

As the process in step S116 is terminated, the encoding process is terminated.

[Flow of Intra Prediction Process]

Figure 9:
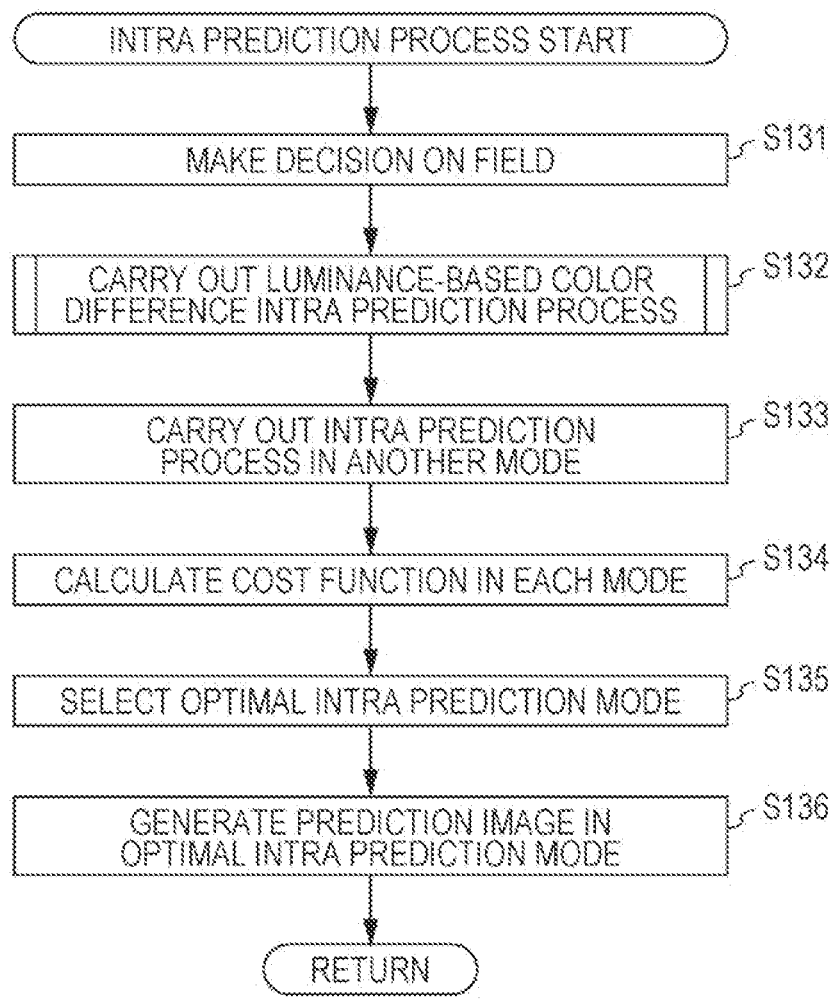
FIG. 9 is a flowchart explaining an example of a flow of intra prediction process.

Next, with reference to the flowchart in FIG. 9, an example of a flow of intra prediction process executed by step S103 in FIG. 8 is described.

As the intra prediction process is started, the field decision section 121 makes a decision on the type of field of the current field in step S131. That is, the field decision section 121 makes a decision on whether the current field, which is subjected to the process, of the inputted image to be field encoded is the top field or bottom field.

In step S132, the luminance-based color difference intra prediction section 122 carries out the luminance-based color difference intra prediction process using the result of the decision in step S131 to generate an intra prediction image of the color difference signal.

In step S133, the intra prediction section 114 carries out the intra prediction in a mode other than the luminance-based color difference intra prediction.

In step S134, the intra prediction section 114 calculates the cost function in each mode using the intra prediction image in each mode generated in steps S132 and S133.

In step S135, the intra prediction section 114 selects a mode having a smallest value among the cost function values calculated in step S134 as the optimal intra prediction mode.

In step S136, the intra prediction section 114 carries out the intra prediction in the optimal intra prediction mode selected in step S135 to generate a prediction image.

As the process in step S136 is terminated, the intra prediction section 114 terminates the intra prediction process, returns the process to step S103 in FIG. 8, and executes process after that.

[Flow of Luminance-Based Color Difference Intra Prediction Process]

Figure 10:
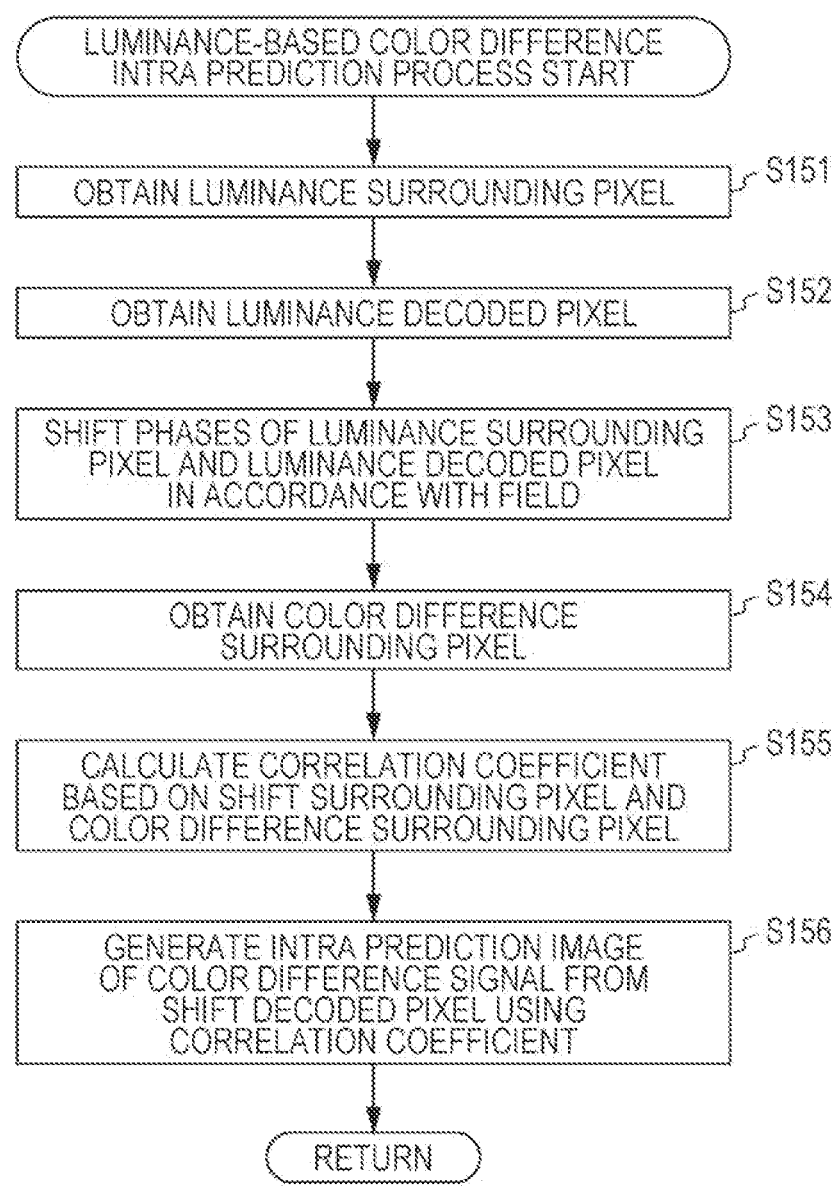
FIG. 10 is a flowchart explaining an example of a flow of luminance-based color difference intra prediction process.

Next, with reference to the flowchart in FIG. 10, an example of a flow of luminance-based, color difference intra prediction process executed in step S132 in FIG. 9 is described.

As the luminance-based color difference intra prediction process is started, in step S151, the luminance surrounding pixel buffer 151 obtains a luminance surrounding pixel from the intra prediction section 114.

In step S152, the luminance decoded pixel buffer 152 obtains a luminance decoded pixel from the intra prediction section 114.

In step S153, the phase shift section 153 shifts the phase of the luminance surrounding pixel obtained in step S151 and the phase of the luminance decoded pixel obtained in step S152, respectively, in accordance with the type of current field decided in step S131 in FIG. 9 and the vertical resolution ratio of the luminance signal to the color difference signal.

In step S154, the color difference surrounding pixel buffer 156 obtains a color difference surrounding pixel from the intra prediction section 114.

In step S155, the correlation coefficient calculation section 157 calculates a correlation coefficient based on the shift surrounding pixel obtained by the process in step S153 and the color difference surrounding pixel obtained in step S154.

In step S156, the prediction image generation section 158 generates an intra prediction image of the color difference signal from the shift decoded pixel obtained by the process in step S153 using she correlation coefficient calculated in step S155.

As the process in step S156 is terminated, the prediction image generation section 153 terminates the luminance-based color difference intra prediction process, returns the process to step S132 in FIG. 9, and executes process after that.

As described above, by carrying out each process, the image encoder 100 can generate an intra prediction image of a color difference signal of high prediction accuracy. This enables the image encoder 100 to improve the encoding efficiency and also to inhibit reduction of image quality of a decoded image caused by production of phase shift in the color difference signal in intra prediction.

2. Second Embodiment

Image Decoder

Figure 11:
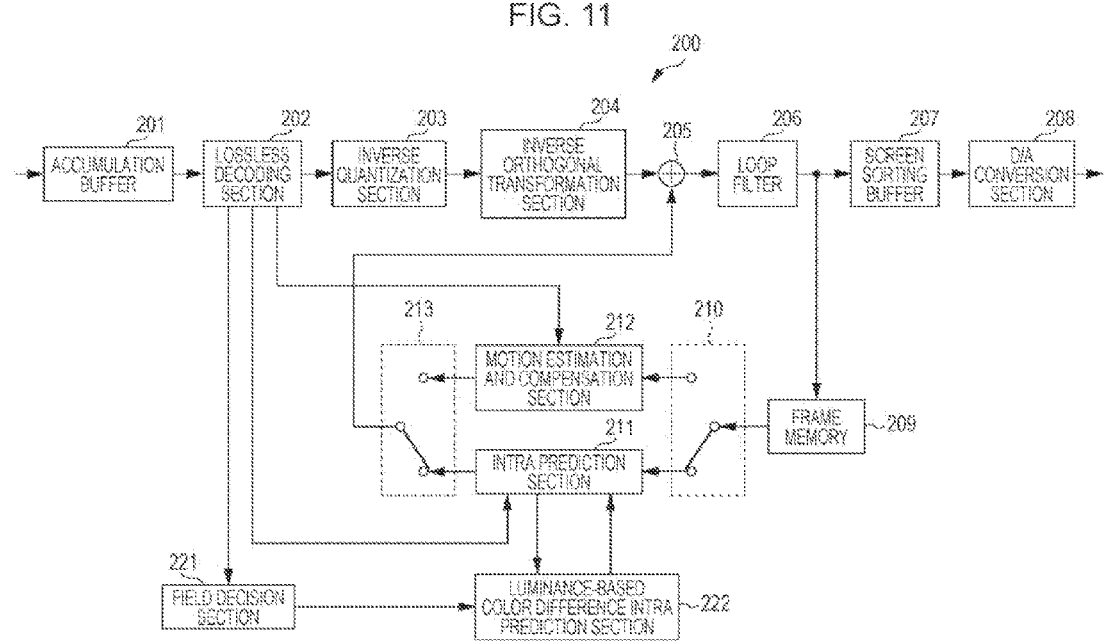
FIG. 11 is a block diagram illustrating a main configuration example of an image decoder.

FIG. 11 is a block diagram illustrating a main configuration example of an image decoder as an image processor to which an embodiment of the present technique is applied. The image decoder 200 illustrated in FIG. 11 corresponds to the image encoder 100 described above and correctly decodes the bit stream (encoded data) generated by encoding image data by the image encoder 100 to generate a decoded image. That is, the image decoder 200 decodes encoded data of an encoded image to be field encoded in an interlaced format having different vertical resolutions in the luminance signal and de color difference signal.

As illustrated in FIG. 11, the image decoder 200 has an accumulation buffer 201, a lossless decoding section 202, an inverse quantization section 203, an inverse orthogonal transformation section 204, an arithmetic section 205, a loop filter 206, a screen sorting buffer 207, and a D/A conversion section 208. The image decoder 200 also has a frame memory 209, a selection section 210, an intra prediction section 211, a motion estimation and compensation section 212, and a selection section 213.

The accumulation buffer 201 accumulates encoded data that has been transmitted and supplies the encoded data to the lossless decoding section 202 at a predetermined timing. The lossless decoding section 202 decodes the information encoded by the lossless encoding section 106 in FIG. 1 and supplied from the accumulation buffer 201 in a scheme corresponding to the encoding of the lossless encoding section 106. The lossless decoding section 202 supplies the quantized coefficient data of the difference image obtained by decoding to the inverse quantization section 203.

The lossless decoding section 202 also makes a decision on whether an intra prediction mode or an inter prediction mode is selected for an optimal prediction mode referring to the information related to the optimal prediction mode obtained by decoding the encoded data. That is, the lossless decoding section 202 makes a decision on whether the prediction mode employed for the encoded data that has been transmitted is intra prediction or inter prediction.

The lossless decoding section 202 supplies the information related to the prediction mode to the intra prediction section 211 or to the motion estimation and compensation section 212 based on the result of the decision. For example, in a case of selecting an intra prediction mode as the optimal prediction mode in the image decoder 200, the lossless decoding section 202 supplies intra prediction information, which is information related to the selected intra prediction mode, supplied from the encoding side to the intra prediction section 211. In addition, for example, in a case of selecting an inter prediction mode as the optimal prediction mode in the image decoder 200, the lossless decoding section 202 supplies inter prediction information, which is information related to the selected inter prediction mode, supplied from the encoding side to the motion estimation and compensation section 212.

The inverse quantization section 203 carries out inverse quantization of the quantized coefficient data obtained by decoding by the lossless decoding section 202 in a scheme corresponding to the quantization of the quantization section 105 in FIG. 1 (a scheme similar to the inverse quantization section 108). The inverse quantization section 203 supplies the quantized coefficient data to the inverse orthogonal transformation section 204.

The inverse orthogonal transformation section 204 inversely orthogonally transforms the coefficient, data supplied from the inverse quantization section 203 in a scheme corresponding to the orthogonal transformation of the orthogonal transformation section 104 in FIG. 1. The inverse orthogonal transformation section 204 obtains a difference image corresponding to a difference image before the orthogonal transformation in the image encoder 100 by the inverse orthogonal transformation process.

The difference image obtained, by inverse orthogonal transformation is supplied to the arithmetic section 205 in addition, to the arithmetic section 205, a prediction image is supplied from the intra prediction section 211 or the motion estimation and compensation section 212 via the selection section 213.

The arithmetic section 205 adds the difference image and the prediction image to obtain a reconfigured image corresponding to the image before subtraction of the prediction image by the arithmetic section 103 of the image encoder 100. The arithmetic section 205 supplies the reconfigured image to the loop filter 206.

The loop filter 206 generates a decoded image by appropriately applying loop filtering process, including deblocking filtering process, adaptive loop filter process, and the like to the supplied reconfigured image. For example, the loop filter 206 carries out the deblocking filtering process for the reconfigured image, thereby eliminating block distortion. In addition, for example, the loop filter 206 carries out the loop filtering process for the deblocking filtering process result (the reconfigured image subjected to elimination of block distortion) using a wiener filter, thereby improving the image quality.

The type of filtering process carried out by the loop filter 206 is optional, and filtering process other than above may also be carried out. In addition, the loop filter 206 may also carry out the filtering process using the filter coefficient supplied from the image encoder 100 in FIG. 1.

The loop filter 206 supplies the decoded image as a filtering process result to the screen sorting buffer 207 and the frame memory 209. The filtering process by the loop filter 206 can also be omitted. That is, it is also possible to store the output of the arithmetic section 205 in the frame memory 209 without filtering processed. For example, the intra prediction section 211 utilizes the pixel value of a pixel, contained in this image as the pixel value of the surrounding pixel.

The screen sorting buffer 207 carries out sorting of the supplied decoded image. In other words, the frame order sorted for an encoding order by the screen sorting buffer 102 in FIG. 1 is sorted into the original display order. The D/A conversion section 208 converts D/A of the decoded image supplied from the screen sorting buffer 207 and outputs it on a display, not shown, for display.

The frame memory 209 memorizes the reconfigured image and the decoded image thus supplied. The frame memory 209 also supplies the reconfigured image and the decoded image memorized therein to the intra prediction section 211 and the motion estimation and compensation section 212 via the selection section 210 at a predetermined timing or based on a request from outside, such as the intra prediction section 211 and the motion estimation and compensation section 212.

The intra prediction section 211 carries out process basically similar to the intra prediction section 114 in FIG. 1. It should be noted that the intra prediction section 211 carries out intra prediction only for the region having a prediction image generated therein by intra prediction upon encoding.

The motion estimation and compensation section 212 carries out inter prediction (including motion estimation and motion compensation) based on the inter prediction information supplied from the lossless decoding section 202 and generates a prediction image. The motion estimation and compensation section 212 carries out inter prediction only for the region subjected to inter prediction upon encoding based on the inter prediction information supplied from the lossless decoding section 202.

The intra prediction section 211 and the motion estimation and compensation section 212 supply the prediction image thus generated for each region of the prediction processing unit to the arithmetic section 205 via the selection section 213.

The selection section 213 supplies the prediction image supplied from the intra prediction section 211 or the prediction image supplied from the motion estimation and compensation section 212 to the arithmetic section 205.

The image decoder 200 further has a field decision section 221 and a luminance-based color difference intra prediction section 222.

In the image decoder 200 as well, intra prediction process basically similar to the intra prediction process carried out in the image encoder 100 described above is executed. That is, the image decoder 200 carries out luminance-based color difference intra prediction process similar to the process carried out in the image encoder 100.

The field decision section 221 makes a decision on whether the current field is the top field or bottom field similarly to the field decision section 121. It should be noted that the image decoder 200 is an apparatus to decode encoded data that is obtained by encoding image data. Accordingly, the field decision section 221 obtains a field parity contained in the encoded data for the region intra predicted upon encoding from the lossless decoding section 202 and makes a decision on the type of current field based on the information.

In the encoded data inputted to the image decoder 200, information to identify whether a slice is a slice in the top field or a slice in the bottom field is stored in, for example, the slice header. In addition, in the encoded data, information to identify whether a picture is frame encoded or field encoded is stored in, for example, the picture parameter sec. The field decision section 221 makes a decision on the type of current field based on the information in a case that the encoded data is field encoded.

The field decision section 221 supplies the result of the decision to the luminance-based, color difference intra prediction section 222.

The luminance-based color difference intra prediction section 222 carries out luminance-based color difference intra prediction similar to the prediction of the luminance-based color difference intra prediction section 122. That is, the luminance-based color difference intra prediction section 222 phase shifts the luminance signal obtained from the intra prediction section 211 in accordance with the result of the decision on the current field (the type of field) supplied from the field decision section 221 and the vertical resolution ratio of the luminance signal to the color difference signal, generates an intra prediction image of the color difference signal using the phase shifted luminance signal, and supplies the intra prediction image to the intra prediction section 211.

[Luminance-Based Color Difference Intra Prediction Section]

Figure 12:
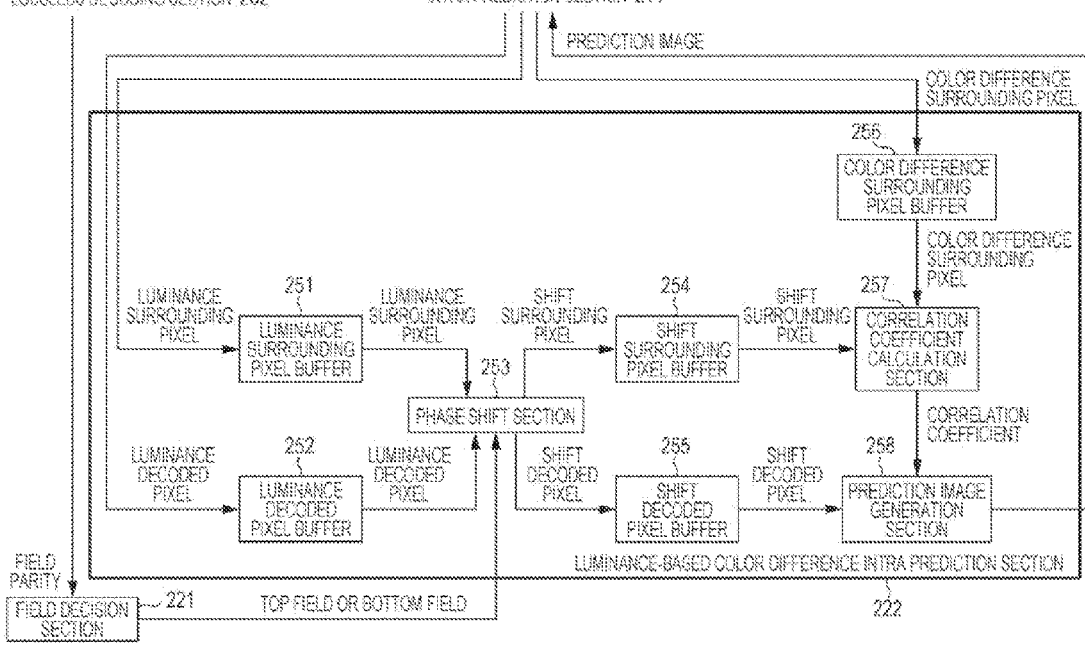
FIG. 12 is a block diagram illustrating a main configuration example of a luminance-based color difference intra prediction section.

FIG. 12 is a block diagram illustrating a main configuration example of the luminance-based color difference intra prediction section 222 in FIG. 11.

As illustrated in FIG. 12, the luminance-based color difference intra prediction section 222 has a luminance surrounding pixel buffer 251, a luminance decoded pixel buffer 252, a phase shift section 253, a shift surrounding pixel buffer 254, a shift decoded pixel buffer 255, a color difference surrounding pixel buffer 256, a correlation coefficient calculation section 257, and a prediction image generation section 258.

That is, the luminance-based color difference intra prediction section 222 has a configuration similar to the configuration of the luminance-based color difference intra prediction section 122. That is, the luminance surrounding pixel buffer 251 through the prediction image generation section 258 are processing sections similar to the luminance surrounding pixel buffer 151 through the prediction image generation section 158 of the luminance-based color difference intra prediction section 122, respectively, and carry out similar process.

Accordingly, the above descriptions on the luminance based color difference intro prediction section 122 can also be applied to the luminance-based color difference intra prediction section 222. That is, since the phase shift section 253 carries out phase shift in accordance with the format of the inputted image (the vertical resolution ratio of the luminance signal to the color difference signal) and the type of current field, the luminance-based color difference intra prediction section 222 can generate an intra prediction image of high prediction accuracy even in a case of decoding encoded data obtained by field encoding image data in an interlaced format having different vertical resolutions in the luminance signal and the color difference signal.

Accordingly, the image decoder 200 can improve the encoding efficiency and can also inhibit reduction of image quality of a decoded image caused by production of phase shift in the color difference signal in intra prediction.

[Flow of Decoding Process]

Next, a flow of each process executed by the image decoder 200 as above is described. Firstly, with reference to the flowchart in FIG. 13, an example of a flow of decoding process is described.

As the decoding process is started, in step S201, the accumulation buffer 201 accumulates the encoded data that has been transmitted. In step S202, the lossless decoding section 202 decodes the encoded data supplied from the accumulation buffer 201. In other words, an I picture, a P picture, and a B picture encoded by the lossless encoding section 106 in FIG. 1 are decoded.

At this time, information, such as motion vector information, reference frame information, prediction mode information (intra prediction mode or inter prediction mode), and parameters related to quantization, is also decoded.

In step S203, the inverse quantization section 203 inversely quantizes the quantized orthogonal transformation coefficient that is obtained by the process in step S202. In step S204, the inverse orthogonal transformation section 204 inversely orthogonally transforms the orthogonal transformation coefficient obtained by the process in step S203.

This turns out to decode the difference information corresponding to the input of the orthogonal transformation section 104 (the output of the arithmetic section 103) in FIG. 1.

In step S205, the intra prediction section 211 or the motion estimation and compensation section 212 carries out prediction process of the image, respectively, corresponding to the prediction mode information supplied from the lossless decoding section 202. In other words, in a case that the intra prediction mode information is supplied from the lossless decoding section 202, the intra prediction section 211 carries out intra prediction process in an intra prediction mode. In a case that the inter prediction mode information is supplied from the lossless decoding section 202, the motion estimation and compensation section 212 carries out inter prediction process (including motion estimation and motion compensation).

In step S206, the arithmetic section 205 adds the prediction image obtained by the process in step S205 to the difference information obtained by the process in step S204. This decodes the original image data.

In step S207, the loop filter 206 appropriately carries out loop filtering process, including deblocking filtering process, adaptive loop filter process, and the like, for the reconfigured image obtained by the process in step S206.

In step S208, the screen sorting buffer 207 carries out sorting of frames of the decoded image data. In other words, the order of frames by the screen sorting buffer 102 (in FIG. 1) of the image encoder 100, sorted for encoding, of the decoded image data is sorted into the original display order.

In step S209, the D/A conversion section 208 converts D/A of the decoded image data having the frames sorted by the process in step S208. The decoded image data is outputted to a display, not shown, and the image is displayed thereon.

In step S210, the frame memory 209 memorizes the decoded image filtered by the process in step S207.

[Flow of Prediction Process]

Figure 13:
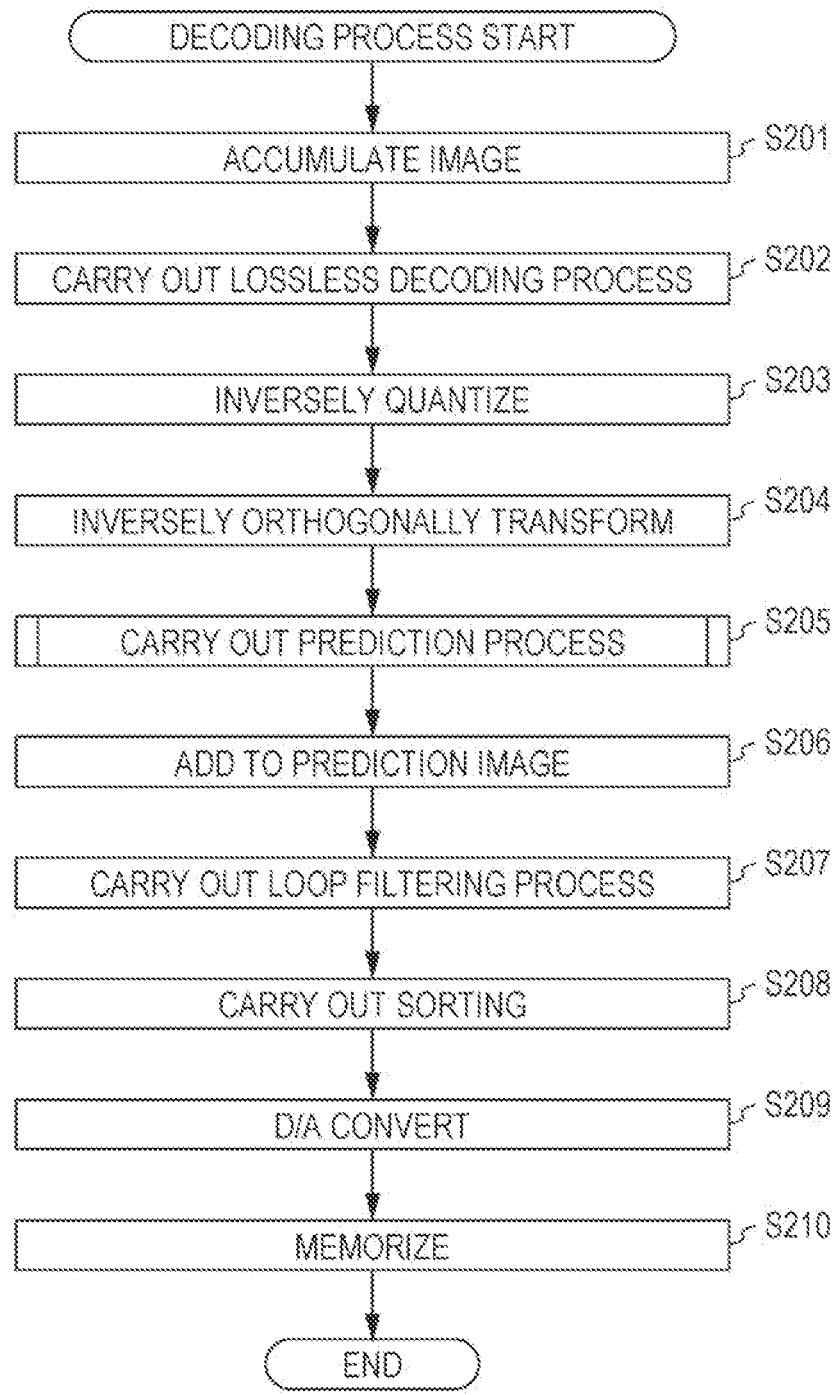
FIG. 13 is a flowchart explaining an example of a flow of decoding process.

Next, an example of a flow of prediction process executed in step S205 in FIG. 13 is described with reference to the flowchart in FIG. 14.

As the prediction process is started, in step S221, the lossless decoding section 202 makes a decision on whether or not the current region, which is subjected to the process, is intra encoded. In a case that the current region is decided as intra encoded, the lossless decoding section 202 advances the process to step S222.

In step S222, the intra prediction section 211 carries out intro prediction process. As the intra prediction process is terminated, the intro prediction section 211 terminates the prediction process and returns the process to FIG. 13.

In addition, in a case that the current region is decided as inter encoded in step S221, the lossless decoding section 202 advances the process to step S223.

In step S223, the motion estimation and compensation section 212 carries out inter motion estimation process. As the inter motion estimation process is terminated, the motion estimation and compensation section 212 terminates the prediction process and returns the process to FIG. 13.

[Flow of Intra Prediction Process]

Figure 14:
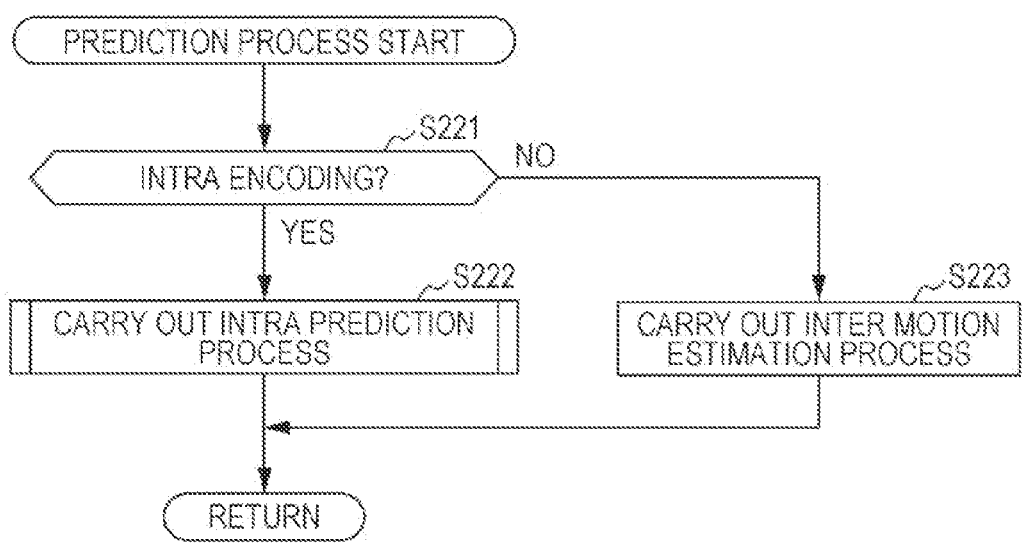
FIG. 14 is a flowchart explaining an example of a flow of prediction process.
Figure 15:
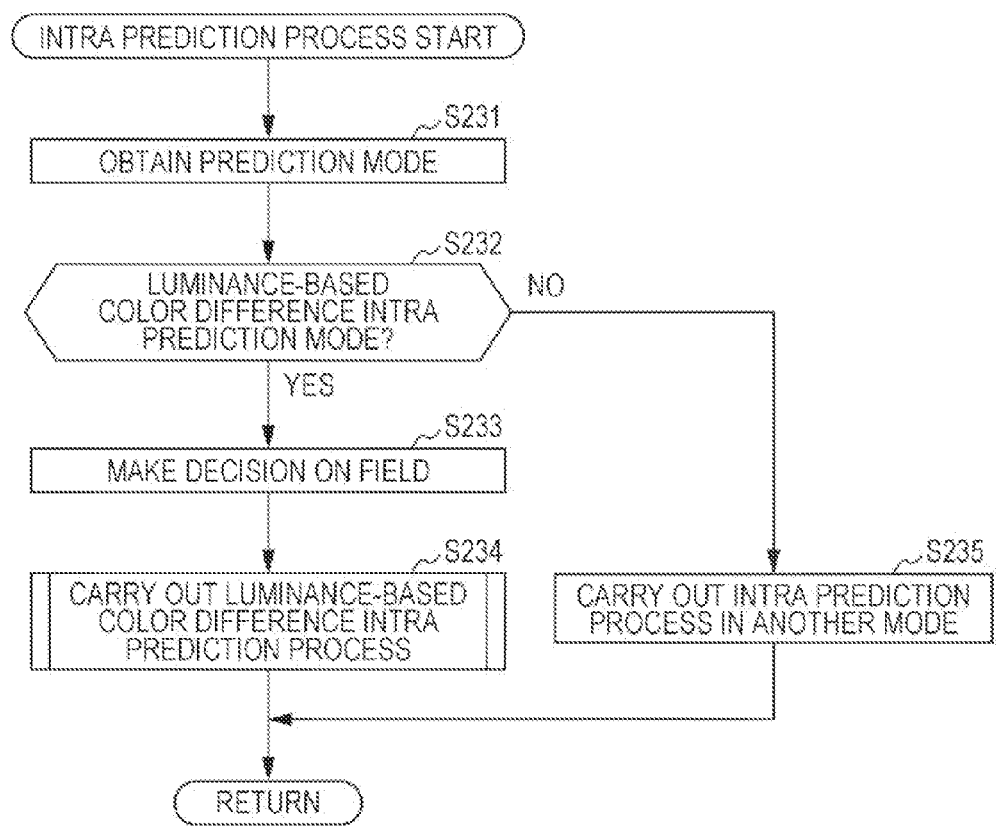
FIG. 15 is a flowchart explaining an example of a flow of intra prediction process.

Next, an example of a flow of intra prediction process executed in step S222 in FIG. 14 is described with reference to the flowchart in FIG. 15.

As the intro prediction process is started, in step S231, the intro prediction section 211 obtains a prediction mode of the current region from the lossless decoding section 202.

In step S232, the intra prediction section 211 makes a decision on whether or not the prediction mode for the current region is a luminance-based color difference intro prediction mode based on the prediction mode obtained in step S231.

In a case of deciding as the luminance-based color difference intra prediction mode, the intra prediction section 211 advances the process to step S233.

In step S233, the field decision section 221 makes a decision on the type of current field.

In step S234, the luminance-based color difference intra prediction section 222 carries out luminance-based color difference intra prediction process. Since the luminance-based color difference intra prediction process is executed similarly to the case referring to the flowchart in FIG. 10, its description is omitted.

As the luminance-based color difference intra prediction process is terminated, the luminance-based color difference intra prediction section 222 terminates the intra prediction process and returns the process to FIG. 14.

In addition, in step S232, in a case of deciding as a mode other than the luminance-based color difference intra prediction mode, the intra prediction section 211 advances the process to step S235.

In step S235, the intra prediction section 211 carries out intra prediction process in a mode other than the luminance-based color difference in prediction mode specified by the prediction mode.

As the process in step S235 is terminated, the intra prediction section 211 terminates the intra prediction process and returns the process to FIG. 14.

As described, above, by carrying out each process, the image decoder 200 can generate an intra prediction image of a color difference signal of high prediction accuracy. Accordingly, the image decoder 200 can improve the encoding efficiency and can also inhibit reduction of image quality of a decoded image caused by production of phase shift in the color difference signal in intra prediction.

3. Third Embodiment

Computer

The series of process described above can be executed by hardware and can also be executed by software. In this case, the process may also be configured as a computer as illustrated in FIG. 16, for example.

Figure 16:
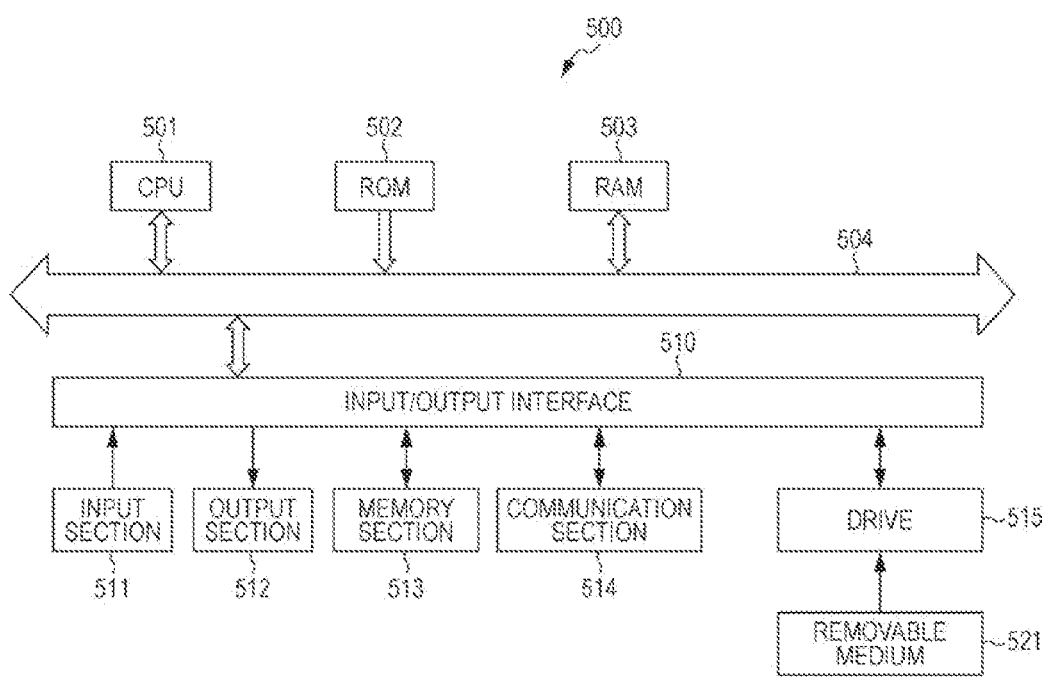
FIG. 16 is a block diagram illustrating a main configuration example of a computer.

In FIG. 16, a computer 500 has a CPU (central processing unit) 501 executes various types of process in accordance with a program memorized in a ROM (read only memory) 502 or a program loaded from a memory section 513 to a RAM (random access memory) 503. In the RAM 503, data desired for execution of the various types of process by the CPU 501 and the like are also memorized appropriately.

The CPU 501, the ROM 502, and the RAM 503 are connected to each other via a bus 504. The bus 504 is also connected to an input/output interface 510.

The input/output interface 510 is connected to an input section 511, including a keyboard, a mouse, a touch screen, and an input port, an output section 512, including an optional output device, such as a display like a CRT (cathode ray tube), an LCD (liquid crystal display), and an GELD (organic electroluminescence display), and a speaker, and an output port, the memory section 513 configured with an optional memory medium, such as a hard disk and a flash memory, a control section to control input/output of the memory medium, and the like, and a communication section 511, including a wired or wireless optional communication device, such as a modem, a LAN interface, a USE (universal serial bus), and Bluetooth®. The communication section 514 carries out communication process with another communication device via, for example, a network including the internet.

The input/output interface 510 is also connected to a drive 515 as desired. To the drive 515, a removable medium 521, such as a magnetic disk, an optical disk, a magneto-optical disk, and a semiconductor memory, is appropriately mounted. The drive 515 reads a computer program, data, and the like out of the removable medium 521 mounted thereto in accordance with, for example, the control of the CPU 501. The data and computer program thus read out are supplied to, for example, the RAM 503. The computer program read out of the removable medium 521 is installed in the memory section 513 as desired.

In a case of executing the series of process described above by software, a program configuring the software are installed from the network or the recording medium.

The recording medium is configured not only with, for example as illustrated in FIG. 16, the removable medium 521, including a magnetic disk (including a flexible disk), an optical disk (including a CD-ROM (compact disc-read only memory) and a DVD (digital versatile disc)), a magneto-optical disk (including an MD (mini disc)), or a semiconductor memory having the program recorded therein, that is separate from the apparatus main body and distributed for program distribution to a user, but also with the ROM 502, the hard disk included in the memory section 513, or the like that is distributed to a user in a state of being built in the apparatus main body in advance and has the program recorded therein.

The program executed by the computer may be a program to carry out the process chronologically in the order described herein and may also be a program to carry out the process in parallel or at a desired timing, such as on call.

In addition, the steps herein to describe the program recorded in the recording medium include the process to be carried out chronologically in the described order as well as the process executed in parallel or individually, not having to be processed chronologically.

Still in addition, a system herein represents the entire apparatus configured with a plurality of devices (apparatuses).

Yet in addition, a configuration described as one device (or a processing section) in the above description may also be divided to configure a plurality of devices (or processing sections). On the contrary, a configuration described as a plurality of devices (or processing sections) in the above description may also be configured as one device (or a processing section) collectively. Naturally in addition, the configuration of each device (or each processing section) may also be added with a configuration other than the above description. Further, as long as the configuration and behaviors as the entire system are substantially same, a portion of a configuration of a certain device (or a processing section) may also be included in a configuration of another device (or another processing section). That is, the embodiments of the present technique are not limited to the embodiments described above and can be modified variously without departing from the spirit of the present technique.

The image encoder 100 (FIG. 1) and the image decoder 200 (FIG. 11) according to the embodiments described above are applicable to various electronics, such as a transmitter or a receiver in wired broadcasting, like satellite broadcasting and cable television, distribution on the internet, distribution to a terminal by cellular communication, and the like, a recording apparatus to record an image in a medium, like an optical disk, a magnetic disk, and a flash memory, and a reproducer to reproduce an image from these memory media. Descriptions are given below to four applications.

4. Fourth Embodiment

Television Apparatus

Figure 17:
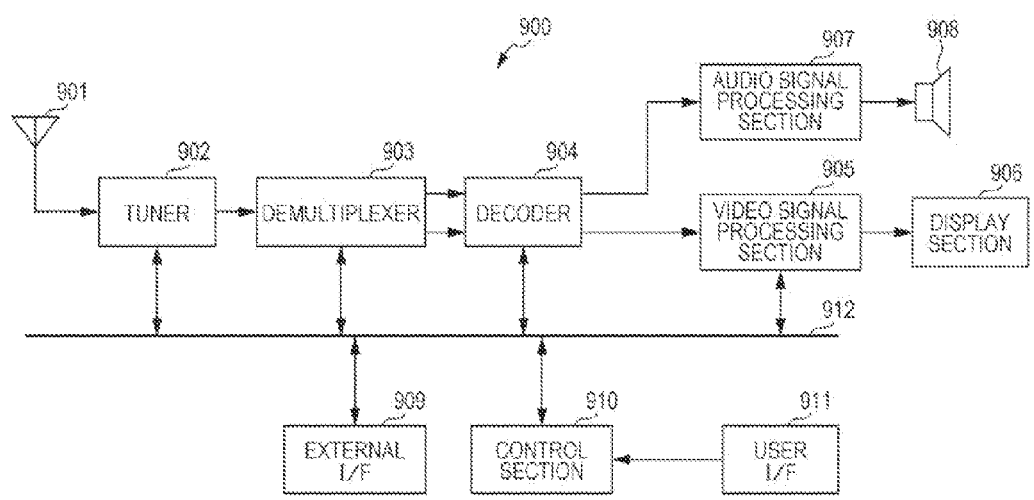
FIG. 17 is a block diagram illustrating a main configuration example of a television apparatus.

FIG. 17 illustrates one example of a schematic configuration of a television apparatus to which the embodiments described above are applied. A television apparatus 900 is provided with an antenna 901, a tuner 902, a demultiplexer 903, a decoder 904, a video signal processing section 905, a display section 906, an audio signal processing section 907, a speaker 908, an external interface 909, a control section 910, a user interface 911, and a bus 912.

The tuner 902 extracts a signal of a desired channel from a broadcasting signal received via the antenna 901, and demodulates the extracted signal. Then, the tuner 902 outputs the encoded bit stream obtained by the demodulation to the demultiplexer 903. That is, the tuner 902 has a role as a transmission section in the television apparatus 900 that receives an encoded stream in which an image is encoded.

The demultiplexer 903 separates a video stream and an audio stream of a broadcasted program to be watched from the encoded bit stream and outputs each separated stream to the decoder 904. The demultiplexer 903 also extracts auxiliary data, such as an EPG (electronic program guide), from the encoded bit stream, and supplies the extracted data so the control section 910. The demultiplexer 903 may also carry out descramble in a case that the encoded bit stream is scrambled.

The decoder 904 decodes the video stream and the audio stream inputted from the demultiplexer 903. Then, the decoder 904 outputs video data generated by the decoding process to the video signal processing section 905. The decoder 904 also outputs audio data generated by the decoding process to the audio signal processing section 907.

The video signal processing section 905 reproduces the video data inputted from the decoder 904 and displays a video on the display section 906. The video signal processing section 905 may also display an application screen supplied via a network on the display section 906. The video signal processing section 905 may also carry out additional process, such as noise elimination for example, for the video data in accordance with settings. Further, the video signal processing section 905 may also generate a GUI (graphical user interface) image, such as a menu, a button, or a cursor for example, to superimpose the image thus generated on the output image.

The display section 906 is driven by a driving signal supplied from the video signal processing section 905, and displays a video or an image on a video surface of a display device (for example, a liquid crystal display, a plasma display, an OELD (organic electroluminescence display), or the like).

The audio signal processing section 907 carries out reproduction process, such as D/A conversion and amplification, for the audio data inputted from the decoder 904, and outputs audio from the speaker 908. The audio signal processing section 907 may also carry out additional process, such as noise elimination, for the audio data.

The external interface 909 is an interface to connect the television apparatus 900 with an external device or a network. For example, the video stream or the audio stream received via the external interface 909 may also be decoded by the decoder 904. That is, the external interface 909 also has a role as a transmission section in the television apparatus 900 that receives an encoded stream in which an image is encoded.

The control section 910 has a processor, such as a CPU, and a memory, such as a PAM and a ROM. The memory memorizes a program to be executed by the CPU, program data, EPG data, data obtained via a network, and the like. The program memorized in the memory is loaded by the CPU upon starting up the television apparatus 900, for example, for execution. By executing a program, the CPU controls a behavior of the television apparatus 900 in accordance with, for example, an operation signal inputted from the user interface 911.

The user interface 911 is connected to the control section 910. The user interface 911 has, for example, a button and a switch for a user to operate the television apparatus 900, a section receiving a remote control signal, and the like. The user interface 911 detects an operation by a user via these components to generate an operation signal and outputs the operation signal thus generated to the control section 910.

The bus 912 connects the tuner 902, the demultiplexer 903, the decoder 904, the video signal processing section 905, the audio signal processing section 907, the external interface 909, and the control section 910 to each other.

In the television apparatus 900 thus configured, the decoder 904 has the functions of the image decoder 200 (FIG. 11) according to the embodiments described above. Accordingly, the decoder 904 can carry out phase shift in accordance with a field for the color difference signal in luminance-based color difference intra prediction in an interlaced format having different vertical resolutions in the luminance signal and the color difference signal. Accordingly, the television apparatus 900 can inhibit production of phase shift relative to the color difference signal in intra prediction to enable improvement of the encoding efficiency.

5. Fifth Embodiment

Mobile Phone

Figure 18:
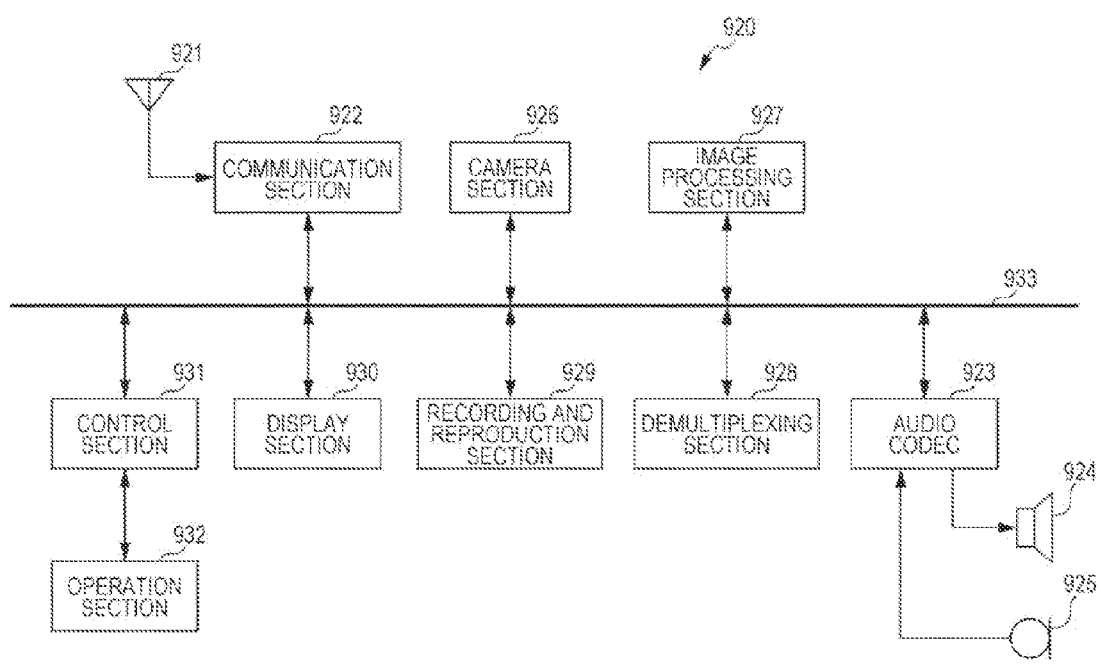
FIG. 18 is a block diagram illustrating a main configuration example of a mobile phone.

FIG. 18 illustrates one example of a schematic configuration of a mobile phone to which the embodiments described above are applied. A mobile phone 920 is provided with an antenna 921, a communication section 922, an audio codec 923, a speaker 924, a microphone 925, a camera section 926, an image processing section 927, a demultiplexing section 928, a recording and reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the demultiplexing section 928, the recording and reproduction section 929, the display section 930, and the control section 931 to each other.

The mobile phone 920 carries out behaviors, such as sending and receiving an audio signal, sending and receiving an email, or image data, imaging an image, and recording data, in various behavior modes including a voice call mode, a data communication mode, a shooting mode, and a video call mode.

In the voice call mode, an analog audio signal generated by the microphone 925 is supplied to the audio codec 923. The audio codec 923 converts the analog audio signal to audio data, converts A/D of the converted audio data, and compresses the data. Then, the audio codec 923 outputs the audio data after compression to the communication section 922. The communication section 922 encodes and modulates the audio data to generate a sent signal. Then, the communication section 922 sends the sent signal thus generated to a base station (not shown) via the antenna 921. The communication section 922 also amplifies the wireless signal received via the antenna 921 and converts the frequency, and obtains a received signal. Then, the communication section 922 demodulates and decodes the received signal and generates audio data, and outputs the audio data thus generated to the audio codec 923. The audio codec 923 extends the audio data and converts D/A of the audio data to generate an analog audio signal. Then, the audio codec 923 supplies the audio signal thus generated to the speaker 924 to output audio.

In the data communication mode, for example, the control section 931 generates character data configuring an email in accordance with an operation by a user via the operation section 932. The control section 931 also displays a character on the display section 930. The control section 931 also generates email data in accordance with a sending instruction from the user via the operation section 932, and outputs the email, data thus generated to the communication section 922. The communication section 922 encodes and modulates the email data to generate a sent signal. Then, the communication section 922 sends the sent signal thus generated to a base station (not shown) via the antenna 921. The communication section 922 amplifies a wireless signal received via the antenna 921 and converts the frequency, and obtains a received signal. Then, the communication section 922 demodulates and decodes the received signal to restore the email data and output the restored email data to the control section 931. The control section 931 causes the display section 930 to display contents of the email and also causes the memory medium of the recording and reproduction section 929 to memorize the email data.

The recording and reproduction section 929 has an optional readable and writable memory medium. For example, the memory medium may be a built-in memory medium, such as a RAM and a flash memory, and may also be an externally mounted memory medium, such as a hard disk, a magnetic disk, a magneto-optical disk, an optical disk, a USB memory, and a memory card.

In the shooting mode, for example, the camera section 926 images an object to generate image data, and outputs the image data thus generated to the image processing section 927. The image processing section 927 encodes the image data inputted from the camera section 926 and causes the memory medium of the recording and reproduction section 929 to memorize the encoded stream.

In a video call mode, for example, the demultiplexing section 928 multiplexes a video stream encoded by the image processing section 927 and an audio stream inputted from the audio codec 923 and outputs the multiplexed stream to the communication section 922. The communication section 922 encodes and modulates the stream to generate a sent signal. Then, the communication section 922 sends the sent signal thus generated to a base station (not shown) via the antenna 921. The communication section 922 also amplifies a wireless signal received via the antenna 921 and converts the frequency, and obtains a received signal. These sent and received signals can include an encoded bit stream. Then, the communication section 922 demodulates and decodes the received signal to restore the stream and outputs the restored stream to the demultiplexing section 928. The demultiplexing section 928 separates the video stream and the audio stream from the inputted stream, and outputs the video stream to the image processing section 927 and the audio stream to the audio codec 923. The image processing section 927 decodes the video stream to generate video data. The video data is supplied to the display section 930, and a series of images is displayed by the display section 930. The audio codec 923 extends the audio stream and converts D/A of the audio stream to generate an analog audio signal. Then, the audio codec 923 supplies the audio signal thus generated to she speaker 924 to cause it to output audio.

In the mobile phone 920 thus configured, the image processing section 927 has the functions of the image encoder 100 (FIG. 1) and the functions of the image decoder 200 (FIG. 11) according to the embodiments described above. Accordingly, regarding the images to be encoded and decoded by the mobile phone 920, the image processing section 927 can carry out phase shift in accordance with a field for a color difference signal in luminance-based color difference intra prediction in an interlaced format having different vertical resolutions in the luminance signal and the color difference signal. Accordingly, the mobile phone 920 can inhibit production of phase shift relative to the color difference signal in intra prediction to improve the encoding efficiency.

In addition, while the mobile phone 920 is described in the above description, an image encoder and an image decoder to which the embodiments of the present technique are applied can also be applied to any apparatus similarly to the case of the mobile phone 920 as long as the apparatus has imaging and communication functions similar to the functions of the mobile phone 920, such as a PDA (personal digital assistants), a smartphone, a UMPC (ultra mobile personal computer), a netbook, and a laptop personal computer, for example.

6. Sixth Embodiment

Recorder/Reproducer

Figure 19:
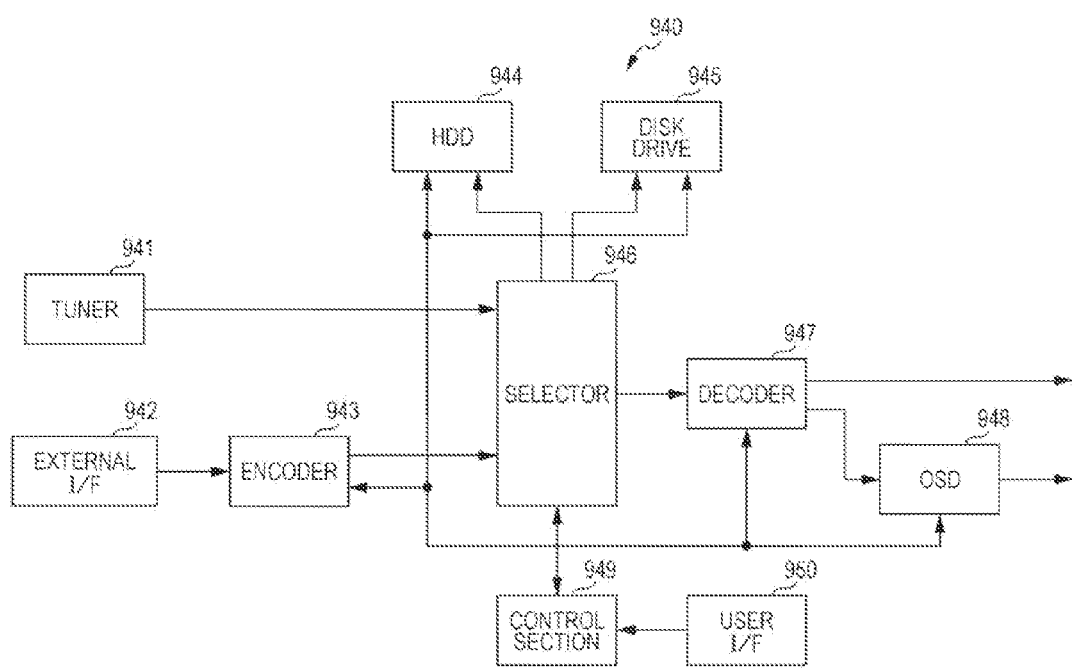
FIG. 19 is a block diagram illustrating a main configuration example of a recorder/reproducer.

FIG. 19 illustrates one example of a schematic configuration of a recorder/reproducer to which the embodiments described above are applied recorder/reproducer 940 encodes audio data and video data of, for example, a received broadcasted program and records them in a recording medium. The recorder/reproducer 940 may also encode audio data and video data obtained from another apparatus, for example, and record them in a recording medium. The recorder/reproducer 940 also reproduces the data recorded in the recording medium on a monitor and a speaker in accordance with, for example, an instruction by a user. At this time the recorder/reproducer 940 decodes the audio data and the video data.

The recorder/reproducer 940 is provided with a tuner 941, an external interface 942, an encoder 943, an HDD (hard disk drive) 944, a disk drive 945, a selector 946, a decoder 947, an OSD (on-screen display) 948, a control section 949, and a user interface 950.

The tuner 941 extracts a signal of a desired channel from a broadcasting signal received, via an antenna (not shown) and demodulates the extracted signal. Then, the tuner 941 outputs an encoded bit stream obtained by the demodulation to the selector 946. That is, the tuner 941 has a role as a transmission section in the recorder/reproducer 940.

The external interface 942 is an interface to connect the recorder/reproducer 940 with an external device or a network. The external interface 942 may be, for example, an IEEE 1394 interface, a network interface, a USE interface, a flash memory interface, or the like. For example, the video data and audio data received via the external interface 942 are inputted to the encoder 943. That is, the external interface 942 has a role as a transmission section in the recorder/reproducer 940.

The encoder 943 encodes video data and audio data in a case that the video data and the audio data inputted from the external interface 942 are not encoded. Then, the encoder 943 outputs the encoded bit streams to the selector 946.

The HDD 944 records an encoded bit stream in which contents data, such as a video and audio, is compressed, various types of programs, and other data in an internal hard disk. The HDD 944 also reads the data out of the hard disk when reproducing the video and audio.

The disk drive 945 carries out recording and reading out for data to a recording medium mounted thereto. The recording medium to be mounted to the disk drive 945 may be, for example, a DVD disk (a DVD-Video, a DVD-RAM, a DVD-R, a DVD-RW, a DVD+R, a DVD+RW, and the like), a Blu-ray® disk, or the like.

The selector 946 selects an encoded bit stream inputted from the tuner 941 or the encoder 943 when recording a video and audio, and outputs the selected encoded bit stream to the HDD 944 or the disk drive 945. The selector 946 also outputs the encoded bit stream inputted from the HDD 944 or the disk drive 945 to the decoder 947 when reproducing the video and audio.

The decoder 947 decodes the encoded bit stream to generate video data and audio data. Then, the decoder 947 outputs the video data thus generated to the OSD 948. The decoder 947 also outputs the audio data thus generated to an external speaker.

The OSD 948 reproduces the video data inputted from the decoder 947 and displays the video. The COD 948 may also superimpose a GUI image, such as a menu, a button, and a cursor, for example, on the video to be displayed.

The control section 949 has a processor, such as a CPU, and a memory, such as a RAM and a ROM. The memory memorizes a program to be executed by the CPU, program data, and the like. The program memorized in the memory is loaded by the CPU upon starting up the recorder/reproducer 940, for example, for execution. By executing a program, the CPU controls a behavior of the recorder/reproducer 940 in accordance with, for example, an operation signal inputted from the user interface 950.

The user interface 950 is connected to the control section 949. The user interface 950 has, for example, a button and a switch, a section receiving a remote control signal, and the like for a user to operate the recorder/reproducer 940. The user interface 950 detects an operation by a user via these components to generate an operation signal and outputs the operation signal thus generated to the control section 949.

In the recorder/reproducer 940 thus configured, the encoder 943 has the functions of the image encoder 100 (FIG. 1) according to the embodiments described above. In addition, the decoder 947 has the functions of the image decoder 200 (FIG. 11) according to the embodiments described above. Accordingly, regarding the images encoded and decoded in the recorder/reproducer 940, the encoder 943 and the decoder 947 can carry out phase shift in accordance with a field for she color difference signal in luminance-based color difference intra prediction in an interlaced format having different vertical resolutions in the luminance signal and the color difference signal. Accordingly, the recorder/reproducer 940 can inhibit production of phase shift relative to the color difference signal in intra prediction to enable improvement of the encoding efficiency.

7. Seventh Embodiment

Imager

Figure 20:
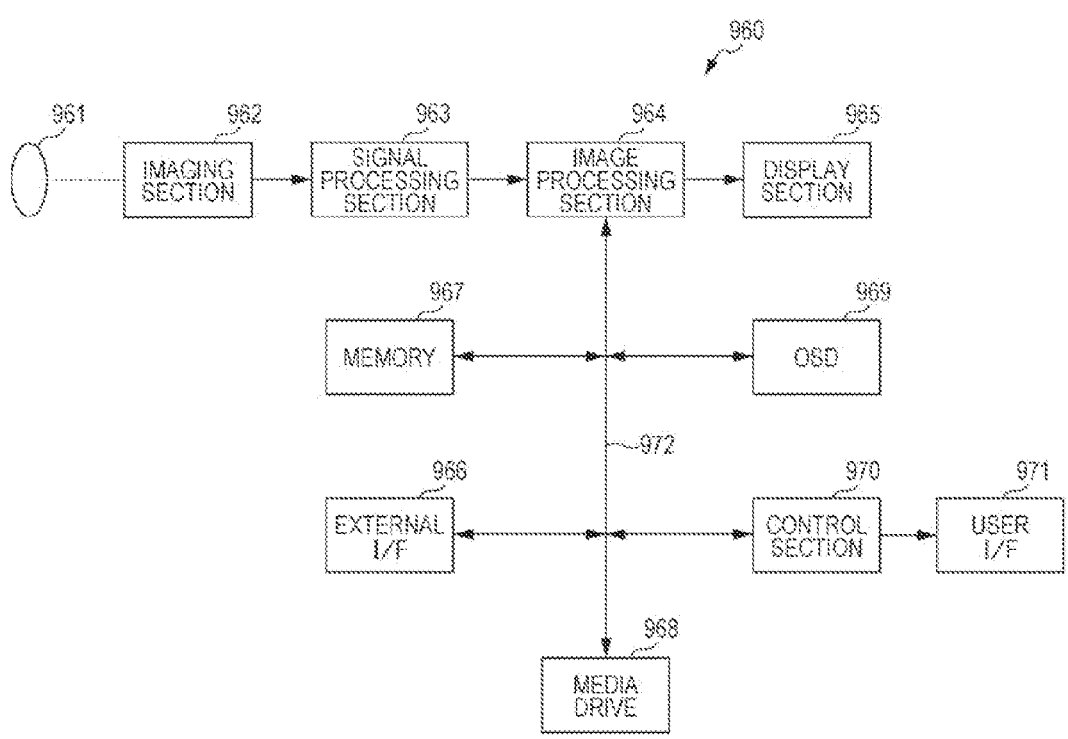
FIG. 20 is a block diagram illustrating a main configuration example of an imager.

FIG. 20 illustrates one example of a schematic configuration of an imager to which the embodiments described above are applied. An imager 960 images an object to generate an image and encodes the image data to record it in the recording medium.

The imager 960 is provided with an optical block 961, an imaging section 962, a signal processing section 963, an image processing section 964, a display section 965, an external interface 966, a memory 967, a media drive 968, an OSD 969, a control section 970, a user interface 971, and a bus 972.

The optical block 961 is connected to the imaging section 962. The imaging section 962 is connected to the signal processing section 963. The display section 965 is connected to the image processing section 964. The user interface 971 is connected to the control section 970. The bus 972 connects the image processing section 964, the external interface 966, the memory 967, the media drive 968, the OSD 969, and the control section 970 to each other.

The optical block 961 has a focus lens, an aperture mechanism, and the like. The optical block 961 causes an optical image of an object to be formed on an imaging surface of the imaging section 962. The imaging section 962 has an image sensor, such as a CCD or a CMOS, and converts the optical image formed on the imaging surface into an image signal as an electrical signal by photoelectric conversion. Then, the imaging section 962 outputs the image signal to the signal processing section 963.

The signal processing section 963 carries out various types of camera signal process, such as knee correction, gamma correction, and color correction, for the image signal inputted from the imaging section 962. The signal processing section 963 outputs the image data after the camera signal process to the image processing section 964.

The image processing section 964 encodes the image data inputted from the signal processing section 963 to generate encoded data. Then, the image processing section 964 outputs the encoded data thus generated to the external interface 966 or the media drive 968. The image processing section 964 also decodes the encoded data inputted from the external interface 966 or the media drive 968 to generate image data. Then, the image processing section 964 outputs the image data thus generated to the display section 965. The image processing section 964 may also output the image data inputted from the signal processing section 963 to the display section 965 to display the image. The image processing section 964 may also superimpose data for display obtained from the OSD 969 on an image outputted to the display section 965.

The OSD 969 generates a GUI image, such as a menu, a button, or a cursor, for example, to output the image thus generated to the image processing section 964.

The external interface 966 is configured as for example, a USB input/output port. The external interface 966 connects the imager 960 with a printer, for example, when printing the image. The external interface 966 is also connected to a drive as desired. As the drive, a removable medium, such as a magnetic disk and an optical disk, is mounted, for example, and a program read out of the removable medium can be installed in the imager 960. Further, the external interface 966 may also be configured as a network interface connected to a network, such as a LAN or the internet. That is, the external interface 966 has a role as a transmission section in the imager 960.

The recording medium to be mounted to the media drive 968 may be an optional readable and writable removable medium, such as a magnetic disk, a magneto-optical disk, an optical disk, and a semiconductor memory, for example. The recording medium may also be mounted to the media drive 968 fixedly to configure a non-portable memory section, such as a built-in hard disk drive and an SSD (solid state drive), for example.

The control section 970 has a processor, such as a CPU, and a memory, such as a RAM and a ROM. The memory memorizes a program to be executed by the CPU, program data, and the like. The program memorized in the memory is loaded by the CPU upon starting up the imager 960, for example, for execution. By executing a program, the CPU controls a behavior of the imager 960 in accordance with, for example, an operation signal inputted from the user interface 971.

The user interface 971 is connected to the control section 970. The user interface 971 has, for example, a button, a switch, and the like for a user to operate the imager 960. The user interface 971 detects an operation by a user via these components to generate an operation signal and outputs the operation signal thus generated to the control section 970.

In the imager 960 thus configured, the image processing section 964 has the functions of the image encoder 100 (FIG. 1) and the functions of the image decoder 200 (FIG. 11) according to the embodiments described above. Accordingly, regarding the images to be encoded and decoded by the imager 960, the image processing section 964 can carry out phase shift in accordance with a field for a color difference signal in luminance-based color difference intra prediction in an interlaced, format having different vertical resolutions in the luminance signal and the color difference signal. Accordingly, the imager 960 can inhibit production of phase shift relative to the color difference signal in intra prediction to improve the encoding efficiency.

Naturally, an image encoder and an image decoder to which the embodiments of the present technique are applied are applicable to an apparatus or a system other than the apparatuses described above.

The descriptions have been given herein to the examples of transmitting quantized parameters from the encoding side to the decoding side. An approach to transmit quantization matrix parameters may also transmit or record as separate data associated with the encoded bit stream without multiplexing into the encoded bit stream. Here, the term "associate" represents that an image contained in the bit stream (may be a portion of an image, such as a slice or a block) can be linked to information corresponding to the image when being decoded. That is, the information may also be transmitted on a transmission line different from the line of the image (or the bit stream). The information may also be recorded in a recording medium different from the image (or the bit stream) (or another recording area in an identical recording medium). Further, the information and the image (or the bit stream) may be associated with each other in an optional unit, such as a plurality of frames, one frame, and a portion of a frame, for example.

While preferred embodiments of the present disclosure have been described in detail referring to the attached drawings, the technical scope of the present disclosure is not limited to such examples. It is apparent that a person ordinarily skilled in the art of the present disclosure can think of various types of modifications or corrections within the scope of the technical idea according to the embodiments of the present disclosure and thus, naturally, these are also understood to belong to toe technical scope of the present disclosure.

The embodiments of the present technique can also have the following configurations.

(1) An image processor, including a phase shift section to shift, upon field encoding an image in an interlaced format having different vertical resolutions in a luminance signal and a color difference signal, a phase of the luminance signal in accordance with a type of current field, which is subjected to process, and a vertical resolution ratio of the luminance signal to the color difference signal; a prediction image generation section to generate an intra prediction image of the color difference signal using the luminance signal having the phase shifted by the phase shift section; and an encoding section to encode, using the intra prediction image generated by the prediction image generation section, the image.

(2) The image processor according to (1) above, wherein the phase shift section shifts a phase of a luminance decoded pixel, which is the luminance signal of a pixel in a current region subjected to process, and a phase of a luminance surrounding pixel, which is the luminance signal of a surrounding pixel located around the current region, respectively.

(3) The image processor according to (2) above, further including a correlation coefficient generation section to generate a correlation coefficient using a color difference surrounding pixel, which is the color difference signal of the surrounding pixel, and a shift surrounding pixel, which is the luminance surrounding pixel having the phase shifted by the phase shift section; wherein the prediction image generation section generates the intra prediction image of the color difference signal from a shift decoded pixel, which is the luminance decoded pixel having the phase shifted by the phase shift section, using the correlation coefficient generated by the correlation coefficient generation section.

(4) The image processor according to any one of (1) through (3) above, wherein the phase shift section determines a shift amount and a direction of the phase of the luminance signal in accordance with the type of current field and the vertical resolution ratio of the luminance signal to the color difference signal and shifts she phase of the luminance signal to shift amount and the direction thus determined.

(5) The image processor according to (4) above, wherein the phase shift section shifts, in a case that a vertical resolution ratio of the luminance signal to the color difference signal is 2:1 and also the current field is a top field, the phase of the luminance signal to a ¼ phase, and shifts, in a case that the vertical resolution ratio of the luminance signal to the color difference signal is 2:1 and also the current field is a bottom field, the phase of the luminance signal to a ¾ phase.

(6) The image processor according to any one of (1) through (5) above, wherein the phase shift section enables phase shift of the luminance signal by linear interpolation.

(7) The image processor according to any one of (1) through (5) above, wherein the phase shift section enables phase shift of the luminance signal by an FIR filter.

(8) The image processor according to (7) above, wherein the phase shift section uses a filter of a ¼ pixel accuracy for motion compensation as the FIR filter.

(9) The image processor according to any one of (1) through (8) above, further including a field decision section to make a decision on the type of current field; wherein the phase shift section shifts the phase of the luminance signal based on a result of decision by the field decision section.

(10) An image processing method of an image processor, including shifting, upon field encoding an image in an interlaced format having different vertical resolutions in a luminance signal and a color difference signal, a phase of the luminance signal in accordance with a type of current field, which is subjected to process, and a vertical resolution ratio of the luminance signal to the color difference signal in a phase shift section; generating an intra prediction image of the color difference signal using the luminance signal having the shifted phase in a prediction image generation section; and encoding, using the intra prediction image thus generated, the image in an encoding section.

(11) An image processor, including a decoding section to decode encoded data in which an image in an interlaced format having different vertical resolutions in a luminance signal and a color difference signal is field encoded; a phase shift section to shift a phase of the luminance signal in accordance with a type of current field, which is subjected to process, and a vertical resolution ratio of the luminance signal to the color difference signal of a difference image between the image and a prediction image of the image obtained by decoding the encoded data by the decoding section; a prediction image generation section to generate an intra prediction image of the color difference signal using the luminance signal having the phase shifted by the phase shift section; and an arithmetic section to add the intra prediction image generated, by the prediction image generation section to the difference image and to generate the image.

(12) The image processor according to (11) above, wherein the phase shift section shifts a phase of a luminance decoded pixel, which is the luminance signal of a pixel in a current region subjected to process, and a phase of a luminance surrounding pixel, which is the luminance signal of a surrounding pixel located around the current region, respectively.

(13) The image processor according to (12) above, further including a correlation coefficient generation section to generate a correlation coefficient using a color difference surrounding pixel, which is the color difference signal of the surrounding pixel, and a shift surrounding pixel, which is the luminance surrounding pixel having the phase shifted by the phase shift section; wherein the prediction image generation section generates the intra prediction image of the color difference signal from a shift decoded pixel, which is the luminance decoded pixel having the phase shifted by the phase shift section, using the correlation coefficient generated by the correlation coefficient generation section.

(14) The image processor according to any one of (11) through (13) above, wherein the phase shift section determines a shift amount and a direction of the phase of the luminance signal in accordance with the type of current field and the vertical resolution ratio of the luminance signal to the color difference signal and shifts the phase of the luminance signal to shift amount and the direction thus determined.

(15) The image processor according to (14), wherein the phase shift section shifts, in a case that a vertical resolution ratio of the luminance signal to the color difference signal is 2:1 and also the current field is a top field, the phase of the luminance signal to a ¼ phase, and shifts, in a case that the vertical, resolution ratio of the luminance signal to the color difference signal is 2:1 and also the current field is a bottom field, the phase of the luminance signal to a ¾ phase.

(16) The image processor according to any one of (11) through (15) above, wherein the phase shift section enables phase shift of the luminance signal by linear interpolation.

(17) The image processor according to any one of (11) through (15) above, wherein the phase shift section enables phase shift of the luminance signal by an FIR filter.

(18) The image processor according to (17) above, wherein the phase shift section uses a filter of a ¼ pixel accuracy for motion compensation as the FIR filter.

(19) The image processor according to any one of (11) through (18) above, further including a field decision section to make a decision on the type of current field; wherein the phase shift section shifts the phase of the luminance signal based on a result of decision by the field decision section.

(20) An image processing method of an image processor, including decoding encoded data in which an image in an interlaced format having different vertical resolutions in a luminance signal and a color difference signal is field encoded in a decoding section; shifting a phase of the luminance signal in accordance with a type of current field, which is subjected to process, and a vertical resolution ratio of the luminance signal to the color difference signal of a difference image between the image and a prediction image of the image obtained by decoding the encoded data in a phase shift section; generating an intra prediction image of the color difference signal using the luminance signal having the shifted phase in a prediction image generation section; and adding the intra prediction image thus generated to the difference image and generating the image in an arithmetic section.

The present disclosure contains subject matter related to that disclosed in Japanese Priority Patent Application JP 2012-009327 filed in the Japan Patent Office on Jan. 19, 2012, the entire contents of which are hereby incorporated by reference.

What is claimed is:
1. An image processor, comprising:
a phase shift section to shift, upon field encoding an image in an interlaced format having different vertical resolutions in a luminance signal and a color difference signal, a phase of the luminance signal in accordance with a type of current field, which is subjected to process, and a vertical resolution ratio of the luminance signal to the color difference signal;

a prediction image generation section to generate an intra prediction image of the color difference signal using the luminance signal having the phase shifted by the phase shift section; and an encoding section to encode, using the intra prediction image generated by the prediction image generation section, the image.

2. The image processor according to claim 1, wherein the phase shift section shifts a phase of a luminance decoded pixel, which is the luminance signal of a pixel in a current region subjected to process, and a phase of a luminance surrounding pixel, which is the luminance signal of a surrounding pixel located around the current region, respectively.

3. The image processor according to claim 2, further comprising:

a correlation coefficient generation section to generate a correlation coefficient using a color difference surrounding pixel, which is the color difference signal of the surrounding pixel, and a shift surrounding pixel, which is the luminance surrounding pixel having the phase shifted by the phase shift section; wherein the prediction image generation section generates the intra prediction image of the color difference signal from a shift decoded pixel, which is the luminance decoded pixel having the phase shifted by the phase shift section, using the correlation coefficient generated by the correlation coefficient generation section.

4. The image processor according to claim 1, wherein the phase shift section determines a shift amount and a direction of the phase of the luminance signal in accordance with the type of current field and the vertical resolution ratio of the luminance signal to the color difference signal and shifts the phase of the luminance signal to shift amount and the direction thus determined.

5. The image processor according to claim 4, wherein the phase shift section shifts, in a case that a vertical resolution ratio of the luminance signal to the color difference signal is 2:1 and also the current field, is a top field, the phase of the luminance signal to a ¼ phase, and shifts, in a case that the vertical resolution ratio of the luminance signal to the color difference signal is 2:1 and also the current field is a bottom field, the phase of the luminance signal to a ¾ phase.

6. The image processor according to claim 1, wherein the phase shift section enables phase shift of the luminance signal by linear interpolation.

7. The image processor according to claim 1, wherein the phase shift section enables phase shift of the luminance signal by an FIR filter.

8. The image processor according to claim 7, wherein the phase shift section uses a filter of a ¼ pixel accuracy for motion compensation as the FIR filter.

9. The image processor according to claim 1, further comprising:

a field decision section to make a decision on the type of current field; wherein the phase shift section shifts the phase of the luminance signal based on a result of decision by the field decision section.

10. An image processing method of an image processor, comprising:

shifting, upon field encoding an image in an interlaced format having different vertical resolutions in a luminance signal and a color difference signal, a phase of the luminance signal in accordance with a type of current field, which is subjected to process, and a vertical resolution ratio of the luminance signal to the color difference signal in a phase shift section;

generating an intra prediction image of the color difference signal using the luminance signal having the shifted phase in a prediction image generation section; and encoding, using the intra prediction image thus generated, the image in an encoding section.

11. An image processor, comprising:

a decoding section to decode encoded data in which an image in an interlaced format having different vertical resolutions in a luminance signal and a color difference signal is field encoded;

a phase shift section to shift a phase of the luminance signal in accordance with a type of current field, which is subjected to process, and a vertical resolution ratio of the luminance signal to the color difference signal of a difference image between the image and a prediction image of the image obtained a decoding the encoded data by the decoding section;

a prediction image generation section to generate an intra prediction image of the color difference signal using the luminance signal having the phase shifted by the phase shift section; and an arithmetic section to add the intra prediction image generated by the prediction image generation section to the difference image and to restore the image.

12. The image processor according to claim 11, wherein the phase shift section shifts a phase of a luminance decoded pixel, which is the luminance signal of a pixel in a current region subjected to process, and a phase of a luminance surrounding pixel, which is the luminance signal of a surrounding pixel located around the current region, respectively.

13. The image processor according to claim 12, further comprising:

a correlation coefficient generation section to generate a correlation coefficient using a color difference surrounding pixel, which is the color difference signal of the surrounding pixel, and a shift surrounding pixel, which is the luminance surrounding pixel having the phase shifted by the phase shift section; wherein the prediction image generation section generates the intra prediction image of the color difference signal from a shift decoded pixel, which is the luminance decoded pixel having the phase shifted by the phase shift section, using the correlation coefficient generated by the correlation coefficient generation section.

14. The image processor according to claim 11, wherein the phase shift section determines a shift amount and a direction of the phase of the luminance signal in accordance with the type of current field and the vertical resolution ratio of the luminance signal to the color difference signal and shifts the phase of the luminance signal to shift amount and the direction thus determined.

15. The image processor according to claim 14, wherein the phase shift section shifts, in a case that a vertical resolution ratio of the luminance signal to the color difference signal is 2:1 and also the current field is a top field, the phase of the luminance signal to a ¼ phase, and shifts, in a case that the vertical resolution ratio of the luminance signal to the color difference signal is 2:1 and also the current field is a bottom field, the phase of the luminance signal to a ¾ phase.

16. The image processor according to claim 11, wherein the phase shift section enables phase shift of the luminance signal by linear interpolation.

17. The image processor according to claim 11, wherein the phase shift section enables phase shift of the luminance signal by an FIR filter.

18. The image processor according to claim 17, wherein the phase shift section uses a filter of a ¼ pixel accuracy for motion compensation as the FIR filter.

19. The image processor according, to claim 11, further comprising:
- a field decision section to make a decision on the type of current field; wherein
- the phase shift section shifts the phase of the luminance signal based on a result of decision by the field decision section.

20. An image processing method of an image processor, comprising:
- decoding encoded data in which an image in an interlaced format having different vertical resolutions in a luminance signal and a color difference signal is field encoded in a decoding section;
- shifting a phase of the luminance signal in accordance with a type of current field, which is subjected to process, and a vertical resolution ratio of the luminance signal to the color difference signal of a difference image between the image and a prediction image of the image obtained by decoding the encoded data in a phase shift section;
- generating an intra prediction image of the color difference signal using the luminance signal having the shifted phase in a prediction image generation section; and
- adding the intra prediction image thus generated to the difference image and restoring the image in an arithmetic section.

* * * * *